US012026264B2

(12) United States Patent
Canim et al.

(10) Patent No.: US 12,026,264 B2
(45) Date of Patent: Jul. 2, 2024

(54) SECURE QUERY PROCESSING ON GRAPH STORES

(71) Applicant: International Business Machines Corporation, Armonk, NY (US)

(72) Inventors: Mustafa Canim, San Jose, CA (US); Joshua F. Payne, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 17/378,699

(22) Filed: Jul. 17, 2021

(65) Prior Publication Data

US 2023/0016113 A1     Jan. 19, 2023

(51) Int. Cl.
*G06F 21/62*     (2013.01)
*G06F 16/901*     (2019.01)
*G06F 16/9035*     (2019.01)
*G06F 16/9038*     (2019.01)
*G06F 21/60*     (2013.01)

(52) U.S. Cl.
CPC ........ *G06F 21/602* (2013.01); *G06F 16/9024* (2019.01); *G06F 16/9035* (2019.01); *G06F 16/9038* (2019.01); *G06F 21/6227* (2013.01)

(58) Field of Classification Search
CPC ............... G06F 21/602; G06F 21/6227; G06F 16/9024; G06F 16/9035; G06F 16/9038; G06F 16/245
See application file for complete search history.

(56) References Cited

U.S. PATENT DOCUMENTS

| | | | |
|---|---|---|---|
| 7,685,437 B2 | 3/2010 | Hacigumus |
| 8,874,930 B2 | 10/2014 | Chase |
| 9,747,456 B2 | 8/2017 | Arasu |
| 9,971,907 B2 | 5/2018 | Egorov |

(Continued)

FOREIGN PATENT DOCUMENTS

| | | | |
|---|---|---|---|
| CN | 115640596 A | 1/2023 |
| EP | 3146438 B1 | 10/2020 |

(Continued)

OTHER PUBLICATIONS

Aditya Grover, et al., "node2vec: Scalable Feature Learning for Networks", Stanford University, 2016.

(Continued)

*Primary Examiner* — Nelson S. Giddins
(74) *Attorney, Agent, or Firm* — Kelsey M. Skodje

(57) ABSTRACT

A processor-implemented method securely responds to a query for information from a data graph. One or more processors create an embedding for encrypted sensitive information in vertices in a data graph; and bucketize embedded encrypted sensitive information on an embedding graph, where bucketizing the embedded encrypted sensitive information clusters vertices from the graph database that have shared data graph features. The processor(s) receive a query of the data graph from a requester, where the query is for information related to the shared data graph features. The processor(s) retrieve a bucket from the embedding graph that contains the information related to the shared data graph features; and extract encrypted sensitive information from the retrieved bucket.

20 Claims, 21 Drawing Sheets

(56) References Cited

U.S. PATENT DOCUMENTS

| | | | | |
|---|---|---|---|---|
| 2010/0306221 | A1* | 12/2010 | Lokam | G06F 16/328 |
| | | | | 707/769 |
| 2016/0330180 | A1* | 11/2016 | Egorov | G09C 1/00 |
| 2017/0091319 | A1* | 3/2017 | Legrand | G06F 16/93 |
| 2017/0322977 | A1* | 11/2017 | Naganuma | G09C 1/00 |
| 2018/0349501 | A1* | 12/2018 | Ramanath | G06F 16/285 |
| 2023/0053063 | A1* | 2/2023 | Dai | G06F 16/9024 |

FOREIGN PATENT DOCUMENTS

| | | |
|---|---|---|
| JP | 2023014431 A | 1/2023 |
| WO | 2016072022 A1 | 5/2016 |

OTHER PUBLICATIONS

Alan Mislove et al., "Measurement and Analysis of Online Social Networks", IMC'07, San Diego, California, USA, Oct. 24-26, 2007.

Apache hbase; www.hbase.apache.org.

Apache TinkerPop, gremlin.

Bijit Hore et al., "A Privacy-Preserving Index for Range Queries", University of California, Irvine, 2004.

Bijit Hore et al., "Secure Multidimensional Range Queries over Outsourced Data", University of California, Irvine, Aug. 9, 2011.

Bryan Perozzi, et al., "DeepWalk: Online Learning of Social Representations", Stony Brook University, 2014.

Chang Liu et al., "Graph Encryption for Top-K Nearest Keyword Search Queries on Cloud", Beijing Engineering Research Center of Massive Language Information Processing and Cloud Computing Application, 2017.

Dhruba Borthakur et al., "Apache Hadoop Goes Realtime at Facebook", SIGMOD '11, Jun. 1-16, 2011, Athens, Greece.

Diederik P. Kingma et al., "Auto-Encoding Variational Bayes", University of Amsterdam, 2013.

Einar Mykletun et al., "Aggregation Queries in the Database-As-a Service Model", 20th Annual IFIP WG 11.3 Working Conference on Data and Applications Security on Data and Applications Security XX—vol. 4127 Jul. 2006.

Fay Chang et al., "Bigtable: A Distributed Storage System for Structured Data", 7th USENIX Symposium on Operating Systems Design and Implementation (OSDI), {USENIX} (2006), pp. 205-218.

Franso Scarselli, et al., "The graph neural network model", Universit of Wollongong, 2009.

Gabriela Suntaxi et al., "Secrecy and performance models for query processing on outsourced graph data", Distribut4ed and Parallel Databased, Jan. 29, 2020.

William L. Hamilton, et al., "Inductive Representation Learning on Large Graphs", Stanford University, 2017.

Hakan Hacigumus et al., "Executing SQL over Encrypted Data in the Database-Service_Provider Model", University of California, Irvine, 2002.

Hong Zhu et al., "Privacy-preserving ranked neighbor query over encrypted graph data in the cloud", Security and Communication Networks, vol. 9, Issue 16 p. 3167-3177, Jul. 7, 2016.

IBM Watson Knowledge Catalog (WKC).

Jayanta Mondal et al., "Managing Large Dynamic Graphs Efficiently", SIGMOD '12, Scottsdale, Arizona, USA, May 20-24, 2012.

Peter Mell and Timothy Grance, "The NIST Definition of Cloud Computing", National Institute of Standards and Technology, US Department of Commerce, 2011.

Qjan Wang et al., "SecGDB: Graph Encryption for Exact Shortest Distance Queries with Efficient Updates", Wuhan University, 2017.

Sakina Mahboubi et al., "Top-k Query Processing Over Outsourced Encrypted Data", Project Teams Zenith, Research Report, Apr. 2017.

Sharp,Austin et al., "JanusGraph".

Somayeh Soltani et al., "Separating Indexes from Data: A Distributed Scheme for Secure Database Outsourcing", IscCurei, Jul. 2011.

SPARQL Overview.

Stanford Network Analysis Platform (SNAP), Stanford University, 2018.

Thomas N. Kipf et al., "Semi-Supervised Classification with Graph Convolutional Networks", University of Amsterdam, 2017.

Tim Kraska et al., "The Case for Learned Index Structures", MIT, 2017.

Apache hbase, www.hbase.apache.org, accessed May 11, 2021, 3 pgs. (cited on IDS filed Jul. 17, 2021 and document submitted on Jul. 17, 2021).

Apache TinkerPop, gremlin, accessed May 11, 2021, 3 pgs. (cited on IDS filed Jul. 17, 2021 and document submitted on Jul. 17, 2021).

Borthakur et al., "Apache Hadoop Goes Realtime at Facebook," SIGMOD '11, Jun. 12-16, 2011, Athens, Greece, © 2011 ACM 978-1-4503-0661-4/11/06, 10 pgs. (cited on IDS filed Jul. 17, 2021 and document submitted on Jul. 17, 2021).

Cao et al., "Privacy-Preserving Query over Encrypted Graph-Structured Data in Cloud Computing," 2011 31st International Conference on Distributed Computing Systems, 2011, pp. 393-402, doi: 10.1109/ICDCS.2011.84.

Followerwonk, "What can followerwonk do for you?" www.followerwonk.com, printed Jul. 18, 2022, 1 pg.

Grover et al., "node2vec: Scalable Feature Learning for Networks," Stanford University, 2016, 10 pgs. (cited on IDS filed Jul. 17, 2021 and document submitted on Jul. 17, 2021).

Hacigumus et al., "Executing SQL over Encrypted Data in the Database-Service-Provider Model," ACM SIGMOD Jun. 4-6, 2002, Madison, WI, © 2002 ACM 1-58113-497-5/02/06, 12 pgs. (cited on IDS filed Jul. 17, 2021 and document submitted on Jul. 17, 2021).

Hamilton et al., "Inductive Representation Learning on Large Graphs," arXiv:1706/02216v4 [cs.SI] Sep. 10, 2018, 19 pgs. (cited on IDS filed Jul. 17, 2021 and document submitted on Jul. 17, 2021).

Hore et al., "A Privacy-Preserving Index for Range Queries," University of California, Irvine, 2004, pp. 720-731. (cited on IDS filed Jul. 17, 2021 and document submitted on Jul. 17, 2021).

Hore et al., "Secure Multidimensional Range Queries over Outsourced Data," University of California, Irvine, Aug. 9, 2011, pp. 1-29.

IBM, "Watson Knowledge Catalog on Cloud Pak for Data as a Service," https://dataplatform.cloud.ibm.com/docs/content/wsj/landings/wkc, Mar. 1, 2021, 5 pgs. (cited on IDS filed Jul. 17, 2021 and document submitted on Jul. 17, 2021).

JanusGraph, https://janusgraph.org., accessed May 11, 2021, 4 pgs. (cited on IDS filed Jul. 17, 2021 and document submitted with this IDS).

Kingma et al., "Auto-Encoding Variational Bayes," arXiv:1312.6114v10, [stat.ML]May 1, 2014, 14 pgs. (cited on IDS filed Jul. 17, 2021 and document submitted on Jul. 17, 2021).

Kipf et al., "Semi-Supervised Classification with Graph Convolutional Networks," arXiv:1609.029074v4 [cs.LG] Feb. 22, 2017, 14 pgs. (cited on IDS filed Jul. 17, 2021 and document submitted with this IDS).

Kraska et al., "The Case for Learned Index Structures," arXiv:1712.01208v3 [cs.DB] Apr. 30, 2018, 30 pgs. (cited on IDS filed Jul. 17, 2021 and document submitted with this IDS).

Liu et al., "Graph Encryption for Top-K Nearest Keyword Search Queries on Cloud," Beijing Engineering Research Center of Massive Language Information Processing and Cloud Computing Application, 2017, pp. 1-11. (cited on IDS filed Jul. 17, 2021 and document submitted on Jul. 17, 2021).

Mahboubi et al., "Top-k Query Processing over Outsourced Encrypted Data," PhD diss., INRIA Sophia Antipolis-Méditerranée, HAL Id: lirmm-01502142, https://hal-lirmm.ccsd.cnrs.fr/lirmm-01502142v2, May 23, 2017, 28 pages. (cited on IDS filed Jul. 17, 2021 and document submitted with this IDS).

Mell et al., "The NIST Definition of Cloud Computing," National Institute of Standards and Technology, US Department of Commerce, 2011, 7 pgs. (cited on IDS filed Jul. 17, 2021 and document submitted with this IDS).

(56) References Cited

OTHER PUBLICATIONS

Mislove et al., "Measurement and Analysis of Online Social Networks," IMC'07, San Diego, California, USA, Oct. 24-26, 2007, 14 pgs. (cited on IDS filed Jul. 17, 2021 and document submitted on Jul. 17, 2021).

Mondal et al., "Managing Large Dynamic Graphs Efficiently," SIGMOD '12, Scottsdale, Arizona, USA, May 20-24, 2012, © 2012 ACM 978-1-4503-1247-9/12/05, 12 pgs. (cited on IDS filed Jul. 17, 2021 and document submitted with this IDS).

Mykletun et al., "Aggregation Queries in the Database-As-a Service Model," 20th Annual IFIP WG 11.3 Working Conference on Data and Applications Security on Data and Applications Security XX—vol. 4127 Jul. 2006, 13 pgs. (cited on IDS filed Jul. 17, 2021 and document submitted on Jul. 17, 2021).

Perozzi et al., "DeepWalk: Online Learning of Social Representations," Stony Brook University, 2014, KDD '14, Aug. 24, 27, 2014, ACM 978-1-4503-2956-9/14-08, http://dx.doi.org/10.1145/2623330.2623732, 10 pgs. (cited on IDS filed Jul. 17, 2021 and document submitted on Jul. 17, 2021).

Scarselli et al., "The graph neural network model", University of Wollongong, 2009, IEEE Transactions on Neural Networks, vol. 20, No. 1, pp. 61-80. (cited on IDS filed Jul. 17, 2021 and document submitted on Jul. 17, 2021).

SNAP, "Stanford Network Analysis Project," http://snap.standford/edu, Workshop on MIS2: Misinformation and Misbehavior Mining on the Web, WSDM 2018, 2 pgs. (cited on IDS filed Jul. 17, 2021 and document submitted with this IDS).

Soltani et al., "Separating Indexes from Data: A Distributed Scheme for Secure Database Outsourcing," ISeCure 3, No. 2, 2011, 13 pages. (cited on IDS filed Jul. 17, 2021 and document submitted with this IDS).

SPARQL, "SPARQL Query Language for RDF," https://www.w3org/TR/rdf-sparqul-query, accessed Aug. 29, 2022, 75 pgs. (cited on IDS filed Jul. 17, 2021 and document submitted with this IDS).

Sprout Social, "A powerful solution for social media management," www.simplymeasured.com, printed Jul. 18, 22, 10 bgs.

Suntaxi et al., "Secrecy and Performance Models for Query Processing on Outsourced Graph Data," Distributed and Parallel Databases 39, No. 1, 2021, pp. 35-77. (cited on IDS filed Jul. 17, 2021 and document submitted on Jul. 17, 2021).

Wang et al., "SecGDB: Graph Encryption for Exact Shortest Distance Queries with Efficient Updates," Wuhan University, 2017. (cited on IDS filed Jul. 17, 2021 and document submitted with this IDS).

Wiggers, K., "TigerGraph raises $32 million for graph database tools," https://venturebeat.com/2019/09/25/tigergraph-raises-32-million-for-graph-database-tools/, Sep. 25, 2019, 1 pg.

Canim, Mustafa, "Secure Query Processing on Distributed Graph Stores", Preprint submitted to Journal of LATEX Templates, Dec. 24, 2018, 11 pages.

\* cited by examiner $(3\times0)+(4\times-1)+(3\times2)+(4\times0)+(3\times-2)+(1\times-1)+(2\times-1)+(3\times1)+(5\times0)=-4$

SECURE QUERY PROCESSING ON GRAPH STORES

BACKGROUND

The present invention relates to performing secure query searches on data stores. Still more specifically, one or more embodiments of the present invention performs a secure query search through the use of bucketization of sensitive information on a graph database.

Graph databases are searchable databases that store social network data, relational data, and/or other data stores. A graph database is composed of multiple vertices (also called nodes) that represent entities, data bases, etc. Each vertex in the graph database is connected to one or more other vertices by one or more edges, which contain a description of a relationship between the two or more vertices that are connected by one or more edges, and/or metadata that describes contents of an edge-connected vertex.

Oftentimes, such graph databases are stored on an untrusted server, such as a cloud-based server. As such, any entity that is able to access this untrusted server is able to access sensitive information found on the graph databases.

While such information could be stored in an encrypted form on the untrusted server using an encryption key whose decryption key counterpart is unavailable to the untrusted server, such a system makes it difficult, if not impossible, to conduct a parameter-based query on the encrypted graph database.

That is, if the graph database is stored in an encrypted state on the untrusted server that the untrusted server cannot understand, then any query answers will often return the entire graph database, which the client/owner of the graph database will decrypt, and then search according to the query parameters. This causes an unacceptable level of computational overhead for the client, and results in an unacceptably slow response time to queries on the graph database.

As such, one or more embodiments of the present invention provide a new and useful solution for secure query processing on a graph database that is stored on an untrusted server.

SUMMARY

In one or more embodiments of the present invention, a method securely responds to a query for information from a data graph. One or more processors create an embedding for encrypted sensitive information in vertices in a data graph; and bucketize embedded encrypted sensitive information on an embedding graph, where bucketizing the embedded encrypted sensitive information clusters vertices from the graph database that have shared data graph features. The processor(s) receive a query of the data graph from a requester, where the query is for information related to the shared data graph features. The processor(s) retrieve a bucket from the embedding graph that contains the information related to the shared data graph features; and extract encrypted sensitive information from the retrieved bucket.

In one or more embodiments of the present invention, the processor(s) decrypt the extracted encrypted sensitive information from the retrieved bucket; and return the decrypted extracted encrypted sensitive information to the requester.

In one or more embodiments of the present invention, the sensitive information is a set of metadata information that describes connections to graph vertices and graph edges in the data graph together with a set of labels.

In one or more embodiments of the present invention, the embedding graph is stored on an untrusted server.

In one or more embodiments of the present invention, the embedding for each encrypted sensitive information is initially based on a first-order embedding, which is based on a graph topology of vertices in the data graph.

In one or more embodiments of the present invention, the embedding for each encrypted sensitive information is further based on a second-order embedding that is based on a particular task that is related to the query.

In one or more embodiments of the present invention, bucketizing the embedded encrypted sensitive information on the embedding graph assigns vertices within a predetermined graphical distance into a same bucket.

In one or more embodiments of the present invention, bucketizing the embedded encrypted sensitive information on the embedding graph assigns vertices within a predetermined quantity of vertex hops from one another into a same bucket.

In one or more embodiments, the method(s) described herein are performed by an execution of a computer program product on a computer system.

DETAILED DESCRIPTION

Figure 1:
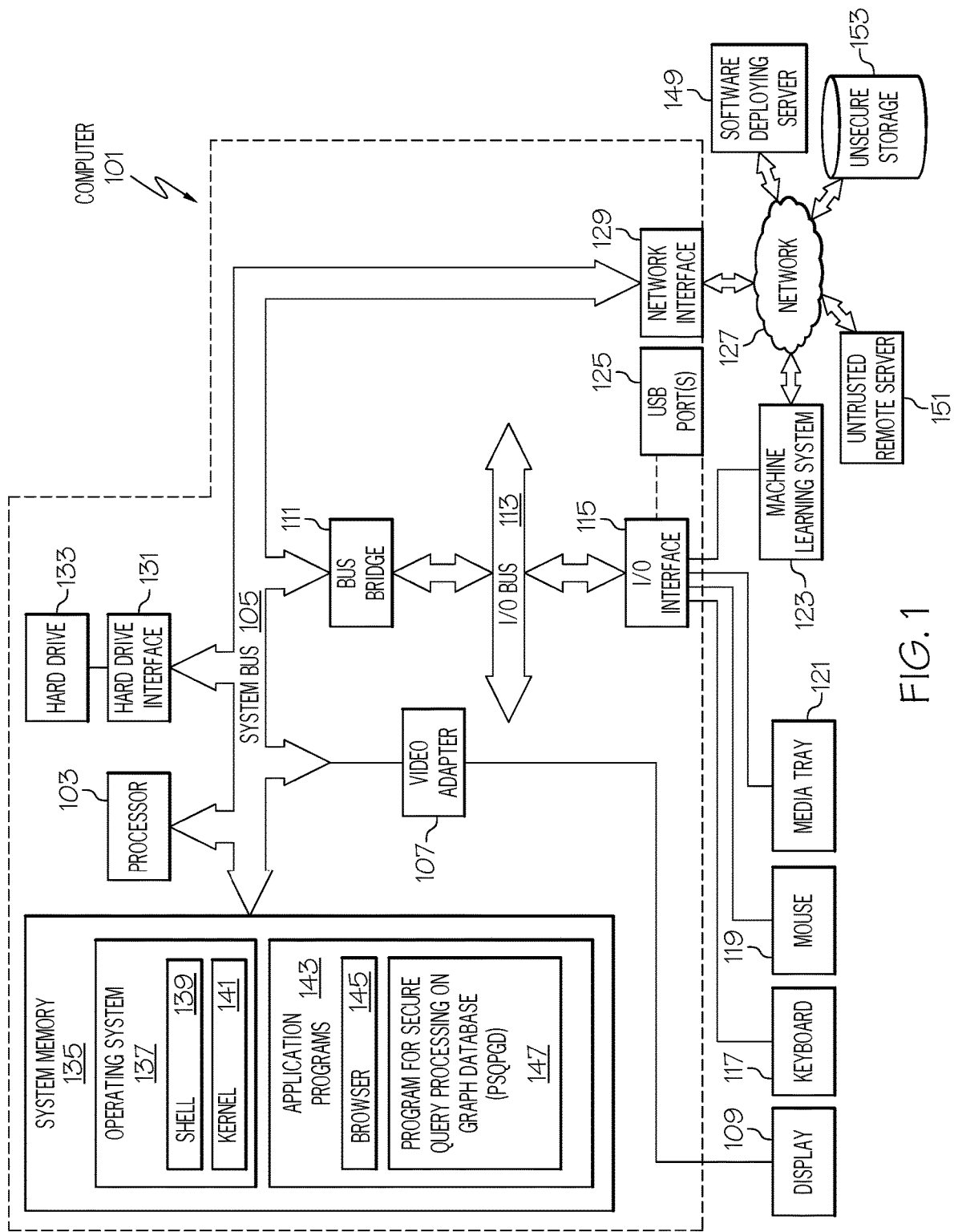
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of one or more embodiments of the present invention. Note that some or all of the exemplary architecture, including both depicted hardware and software, shown for and within computer 101 may be utilized by machine learning system 123 and/or software deploying server 149 and/or untrusted remote server 151 shown in FIG. 1, and/or client computer 301 and/or untrusted remote server 351 shown in FIG. 3, and/or other processing devices depicted in other figures associated with one or more embodiments of the present invention.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113 I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a network 127 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135 which is also coupled to system bus 105. System memory is defined as a lowest level of volatile memory in computer 101. This volatile memory includes additional higher levels of volatile memory (not shown), including, but not limited to, cache memory, registers, and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, one or more embodiments of the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149, untrusted remote server 151 (and thus unsecure storage 153) and other computer systems.

Application programs 143 in computer 101's system memory also include a Program for Secure Query Processing on Graph Database (PSQPGD) 147. PSQPGD 147 includes code for implementing the processes described below, including those described in FIGS. 2-21. In one or more embodiments of the present invention, computer 101 is able to download PSQPGD 147 from software deploying server 149, including in an on-demand basis, wherein the code in PSQPGD 147 is not downloaded until needed for execution. Note further that, in one or more embodiments of the present invention, software deploying server 149 performs all of the functions associated with the present invention (including execution of PSQPGD 147), thus freeing computer 101 from having to use its own internal computing resources to execute PSQPGD 147.

Note that the hardware elements depicted in computer 101 are not intended to be exhaustive, but rather are representative to highlight essential components required by one or more embodiments of the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used herein, the terms "vertex" and "node" are used interchangeably when describing an entity (person, device, set of data, etc.) that is represented in a graph database.

As used herein, the term "graph database" is defined as a database having two types of elements: nodes and edges. A node represents an entity, such as a person, place, thing, event, set of data, etc. An edge connects two nodes, and includes metadata such as the relationship between the two connected nodes. For example, assume that "Mary" is represented by a first node in a graph database; that "Sam" is represented by a second node in that same graph database; and that Mary is Sam's mother. As such, the edge (line) that connects Mary's node to Sam's node contains metadata, describing Mary as being Sam's mother. In another example, assume that "Computer 1" is represented by a first node in a graph database; that "Computer 2" is represented by a second node in that same graph database; and that Computer 1 and Computer 2 are exchanging data. As such, the edge (line) that connects Computer 1's node to Computer 2's node contains metadata, describing data exchanges between Computer 1 and Computer 2, what entities own Computer 1 and Computer 2, etc.

As used herein, the terms "graph database" and "data graph" are used interchangeably to illustrate nodes/vertices and edges in a graph that represents data that is stored in a graph database.

As used herein, the terms "graph bucket embedding", "embedding graph", "embedded graph", "embedding bucket graph", and variations thereof are used interchangeably to describe a graph that depicts traits of nodes on a graph database, such as topological proximities to other nodes on the graph database, shared features (described in the nodes themselves or the edge(s) to which they are connected) of the nodes, etc.

As such, bucketizing embedded encrypted sensitive information, from an embedding graph, clusters vertices/nodes that have "shared data graph features", such as being within a predefined topology, which is either a first-order topology or a second-order topology.

For example, as shown below in FIG. 6, the bucket B3 contains nodes from a data graph that are within a certain number of hops from one another. As used in describing one or more embodiments of the present invention, this "shared data graph feature" is referred to as a type of "first-order topology".

As used herein, a "hop" is defined as a traversal through one or more entities as required to deliver an answer to a query. For example, a "node hop quantity" is the quantity of nodes that must be passed through in a graph database to reach one or more nodes that provide an answer to a query from a query node on the graph database. A "server hop quantity" is a quantity of servers that must be traversed in order to reach these one or more nodes that provide an answer to a query from a query node on the graph database.

Other types of first-order topologies used to define shared data graph features include edge lengths of edges that connect nodes/vertices in the data graph; attributes (i.e., metadata) of the edges that describe relationships between nodes/vertices; etc.

In one or more embodiments of the present invention, a "second-order topology" is used to define a "shared data graph feature" for nodes from a data graph. As described below in FIG. 7, a second-order topology vector based on a first-order topology vector to determine a second-order topology. For example, assume, as described in FIG. 7, that a group of nodes in a data graph are within a certain distance (as described by the length of the edges that connect the nodes) and/or are within a certain number of hops within one another. This leads the present invention to determine, as described in FIG. 7 and FIG. 13 below, that the data in these nodes share a common trait (e.g., two nodes that represent two virtual machines that were created at the same time, as described in FIG. 7). This common trait is referred to as a shared data graph feature, which is based on the second-order topology.

Distributed graph databases raise certain security concerns, such as storing private and/or sensitive information in these databases. One approach in the prior art to protect data records represented in distributed graph databases is to encrypt and store them, in a distributed graph database, in encrypted format. However, this approach requires the data records to always be encrypted on the distributed graph database, which limits the processing capability of remote servers running queries on top of them. That is, if the server receives a request looking for a data on the distributed graph database that meets certain criteria/parameters (e.g., a node for an entity in a certain age range), and that server is unable to decrypt the data records, then the encrypted distributed graph database is useless to that server.

In an approach used in the prior art in which the distributed graph databases are encrypted locally by the servers, the graph databases are initially protected. However, when the servers process queries of the graph databases that they serve and encrypt, they must first decrypt those graph databases, thereby exposing them to data leakage once the data is decrypted and used during query processing.

Thus, one or more embodiments of the present invention enables server-side processing of distributed graph database queries, while preventing the content of such graph databases from being exposed to attackers. More specifically, and in one or more embodiments of the present invention, metadata information about the graph nodes and edges is stored on a third party server along with some labels that can help the server process graph queries while traversing over large graphs.

The growing popularity of social media sites and other users of large databases increases the demand for doing analytics on such large databases, including large-scale graph databases. Such graph databases are deemed to be large not only because they have many vertices and edges, but also because they maintain a significantly large amount of metadata associated with them. The size of such graph databases often requires that they be distributed across multiple servers, which makes the sensitive user data in the graph databases more vulnerable to data theft. Thus, one or more embodiments of the present invention provide protection for such sensitive user data, including that protection that is required by industry standards and/or governmental regulations, such as those required of the health care industry.

As such, one or more embodiments of the present invention process data analytics queries on top of encrypted graph nodes and edges as well as their metadata stored on distributed data stores. One or more embodiments of the present invention leverage a bucketization approach, in which records are assigned a bucket identifier (ID). The user knows bucket ID to region mapping, in order to transform queries into a bucket ID based format before sending it to the server. On the server side the metadata information is encrypted, and only the bucket IDs are stored to further process the records. Once a query is received, the server filters out the records based on the bucket ID list specified in the user query, and a further communication is pursued between the user and server to execute the rest of the query. This technique is illustrated with example shown in FIG. 2 and FIG. 3.

Figure 2:
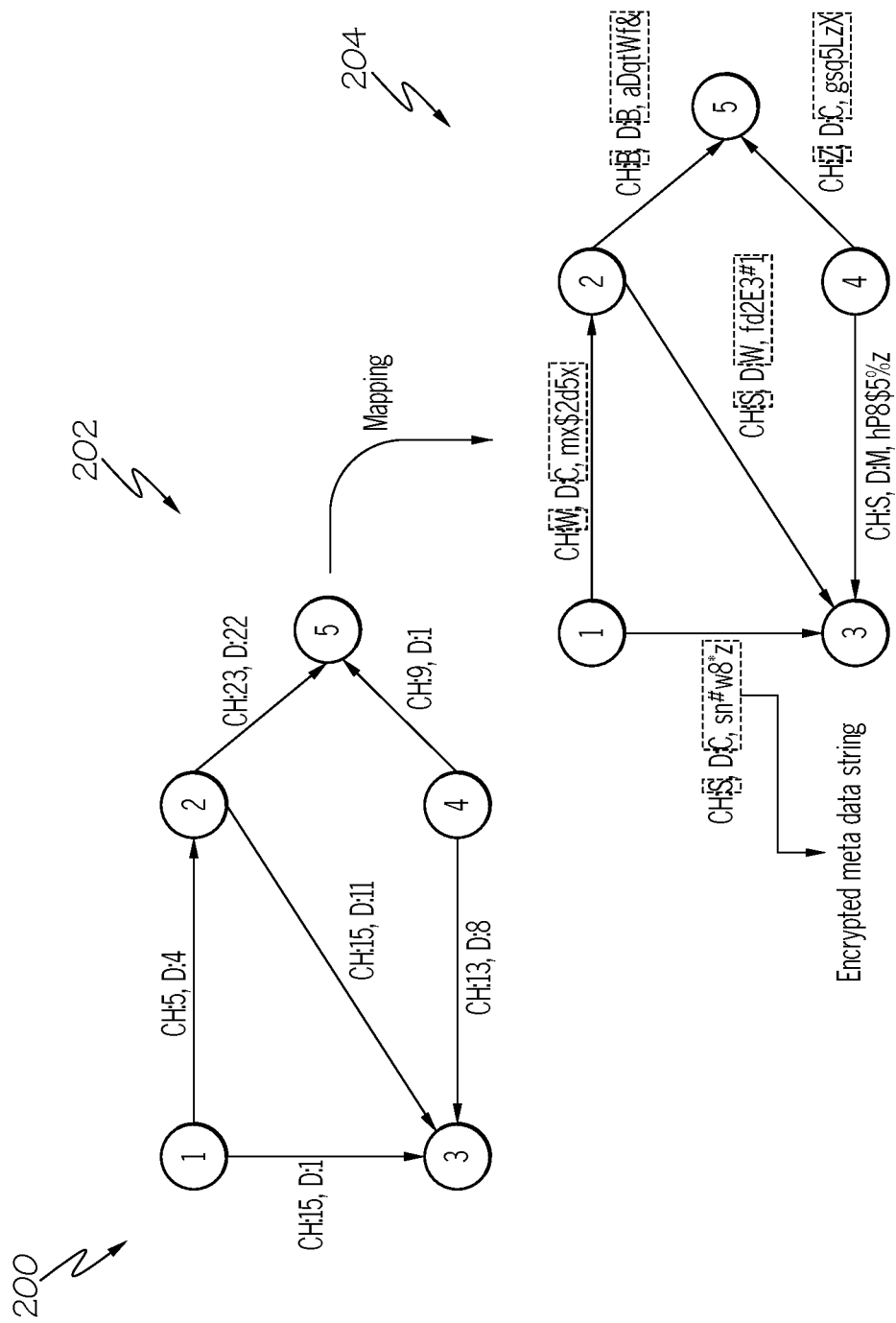
FIG. 2 illustrates a graph database whose sensitive edge metadata has been encrypted.

With reference to FIG. 2, assume that a computer network 200 is depicted as a graph database 202, such that each node (e.g., node 1, node 2, node 3, node 4, and node 5) represents a different computer on the network. Assume that each edge between the computer nodes includes metadata that describes the computer hour (CH) that two computers are exchanging information, and a duration (D) of time, in milliseconds, during which they are exchanging data.

Suppose further that the metadata information (CH and D) is considered to be sensitive, and thus the user wants to keep the metadata in encrypted format in one or more remote servers that are storing the graph database, either redundantly or in a distributed manner. Such encryption is shown in encrypted graph database 204. For example, the CH of 5 between node 1 and node 2 is now replaced with the label W, which identifies a bucket that includes CH 5. Similarly, the D of the data exchange between node 1 and node 2 is now replaced with the label C, which identifies a bucket that includes D4. Furthermore, and in one or more embodiments of the present invention, CH and/or D, individually or in combination, are encrypted into "mx$2d5x", which is meaningless unless a user has access to a decryption key to reveal that the value of CH is 5 and/or D is 4.

Once encrypted, however, the server will lose its processing capabilities on the metadata information. In order to give query processing capability to the servers, one or more embodiments of the present invention provide extra information appended to the edges. Using a domain mapping table, each edge is appended the extra information of the bucket ID of which the value maps into, as described herein.

Once the domains are mapped, the user can now transform the query into a mapped format and send it to the server, where the graph metadata (from the edges on the graph database) information is stored in encrypted format. The mapping table is kept secret (available only to the client side) and the query transformation is performed by the client.

For example, suppose that the client has the following query: "Find all data exchanges between two computers on network 200 within 2 hops away from the computer represented by node 1 which took place between 1 μm and 4 μm and took less than 7 milliseconds." The user first transforms this query into the following format: "Find all edges within 2 hops away vicinity of node 1 where CH='S' and (D='C' or D='M')".

Once this query is received, the server can start traversing the graph starting from node 1 and it can use the bucket ID (e.g., S for CH, and C and M for D) information appended to the encrypted metadata information for the edges to filter out the edges that doesn't qualify. As the traversal continues the result set grows rapidly. Some of the edges in the result set may contain false positives because some edges in the result set may not qualify. To filter out these false positives, the server sends the partial result set to the client. The client decrypts all of the edges in the result set, and sends the qualifying edges back to the server to continue graph traversal. This back and forth execution takes place until the query result is obtained by the client.

The back and forth communication between the client and server will prevent the partial results to exceed manageable sizes while partial results are produced at the server. Otherwise the growth in false positive edges on the server side will cause more false positives edges to be produced and returned to the client while traversing the graph. This will cause high network traffic and execution cost on both client and server side. Thus, this method reduces that load on the system.

Figure 3:
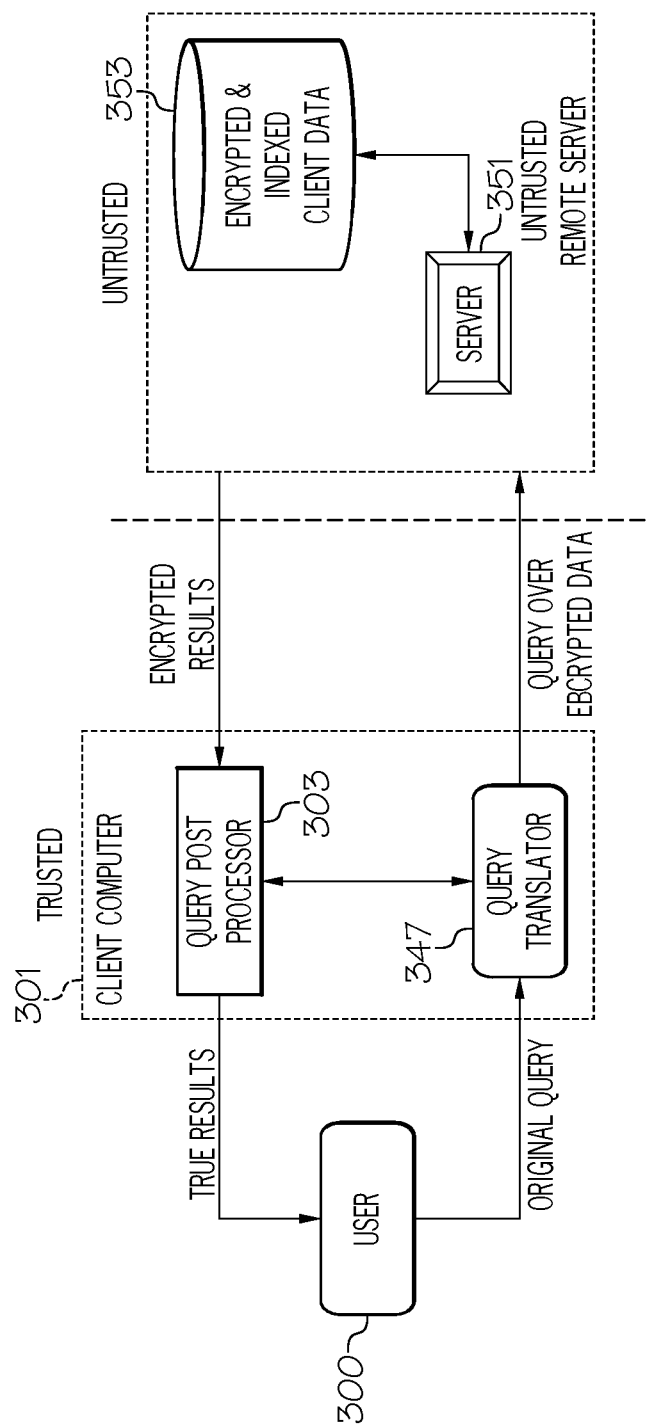
FIG. 3 depicts a high-level overview of one or more embodiments of the present invention.

With reference now to FIG. 3, a further high-level overview of one or more embodiments of the present invention is presented.

As shown in FIG. 3, a client computer 301 (analogous to computer 101 shown in FIG. 1) is a trusted system that wants to store a graph database, having sensitive information, on an untrusted system, such as an untrusted remote server 351 (analogous to untrusted remote server 151 shown in FIG. 1). Assume now that a user 300 of client computer 301 is making an original query, such as that described in FIG. 2 ("Find all data exchanges between two computers on network 200 within 2 hops away from the computer represented by node 1 which took place between 1 pm and 4 pm and took less than 7 milliseconds.").

A query translator (e.g., part of the PSQPGD 147 logic shown in FIG. 1) translates this query, as information described in FIG. 2, into "Find all edges within 2 hops away vicinity of node 1 where CH='S' and (D='C' or D='M')", and sends it to the untrusted remote server 351.

The untrusted remote server 351 has access to an unsecure storage 353 (analogous to unsecure storage 151 shown in FIG. 1), which stores an embedding graph, which shows bucketization of nodes on the graph database 202. That is, the embedding graph shows nodes that are topologically proximate and/or otherwise related as being within a same particular bucket, as described in detail below in FIG. 6 and FIG. 9.

The appropriate buckets are returned as encrypted results to the trusted client computer 301, which uses a query post processor 303 (e.g., processor 103 that is executing PSQPGD 147 shown in FIG. 1) to determine which nodes in graph database 202 provide true results, which are returned to the user 300 in order to answer the original query.

Figure 4:
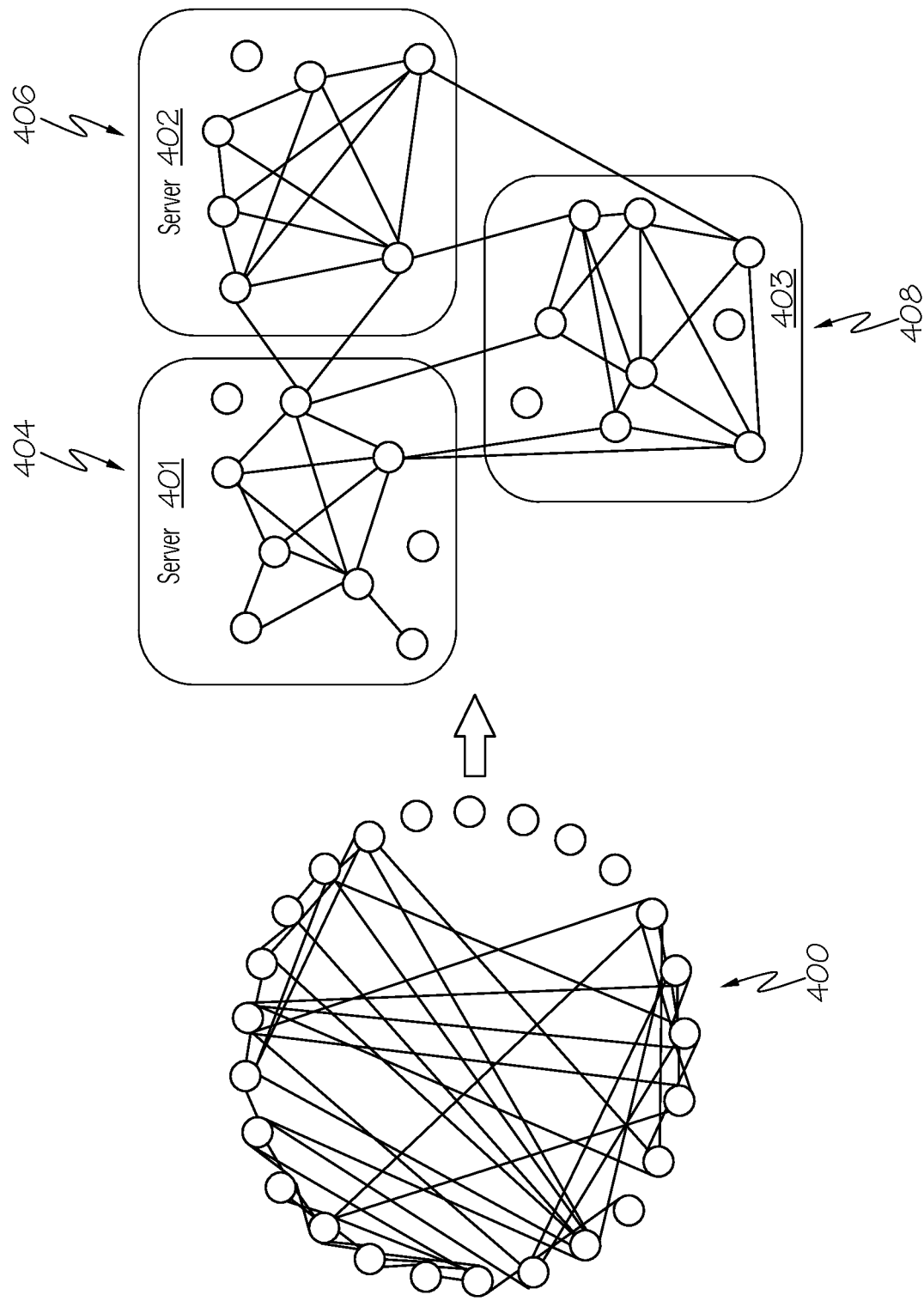
FIG. 4 illustrates an exemplary dense graph database as used in one or more embodiments of the present invention.

With reference now to FIG. 4, an exemplary dense graph database as used in one or more embodiments of the present invention.

Graph databases are often viewed as being either sparse or dense.

A "sparse graph database" is a graph database that has a quantity of edges that are the same as or less than a quantity of nodes, such as those shown below in FIG. 5.

A "dense graph database" is a graph database that has a quantity of edges that exceed the quantity of nodes, such as the full graph database 400 and/or its sub-graph database 404, sub-graph database 406, and/or sub-graph database 408. As shown in FIG. 4, such sub-graph databases can be distributed over different remote (and/or untrusted) servers, such as server 401, server 402, and/or server 403.

One or more embodiments of the present invention utilize distributed dense graph databases such as those depicted in FIG. 4. However, for ease of decryption, the present invention is described below using a sparse graph database that is stored on a single untrusted remote server. Therefore, FIG. 5 illustrates a simplified sparse graph database used to describe concepts of the dense graph database used in one or more embodiments of the present invention.

Figure 5:
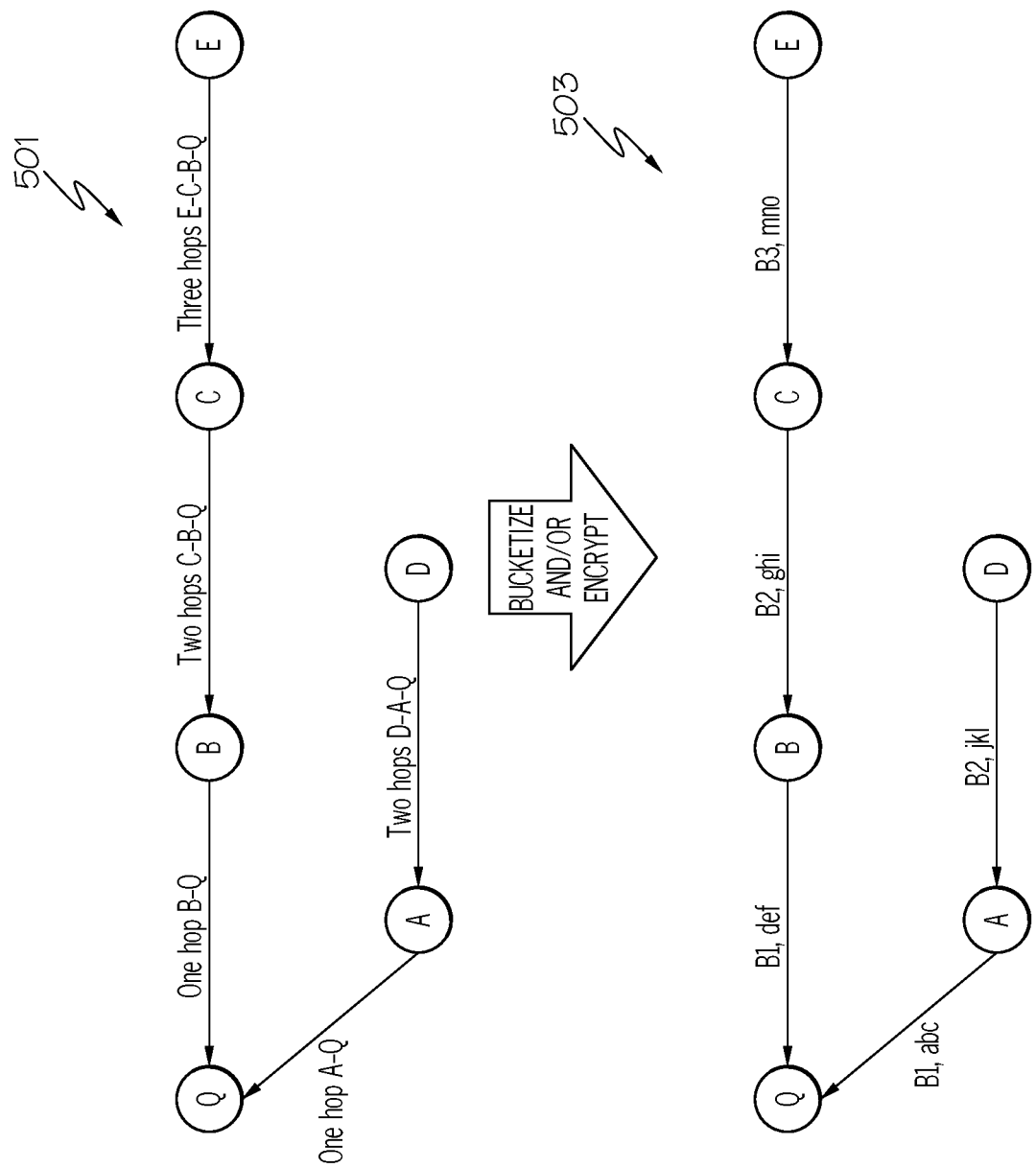
FIG. 5 depicts a simplified sparse graph database used to describe concepts of the dense graph database used in one or more embodiments of the present invention.

With reference then to FIG. 5, consider a first order data graph 501, whose edge metadata describes a hop topology of the data graph 501.

As shown in FIG. 5, data graph 501 has a node A (analogous to node 1 shown in graph database 202 shown in FIG. 2), a node B (analogous to node 2 shown in graph database 202 shown in FIG. 2), a node C (analogous to node 3 shown in graph database 202 shown in FIG. 2), a node D (analogous to node 4 shown in graph database 202 shown in FIG. 2), and a node E (analogous to node 5 shown in graph database 202 shown in FIG. 2). Data graph 501 also has a node Q, which is a node in the data graph 501 that is related to a query being made of other nodes in the data graph 501. For example, a query from the user 300 shown in FIG. 3 may be a query to return any nodes in the data graph 501 that are less than two hops from the query node Q.

In an embodiment of the present invention, the number of hops from the query node Q to other nodes in the data graph 501 are determined by the trusted client, using a random walk through the data graph (in the case of a very large data graph), or a structured walk through the data graph (in the case of a very small data graph).

As such, the client is able to identify how many hops (e.g., 1, 2, or 3) each node in the data graph 501 is from the query node Q.

Before storing such information in an untrusted server, the trusted client will bucketize and/or encrypt the metadata associated with each edge in data graph 501, as shown in the first order encrypted data graph 503. That is, the metadata for the edge between node B and node Q (e.g., "there is one hop between node B and node Q") is shown to be stored in bucket B1, and/or is encrypted (e.g., the metadata describing the one hop between node B and node Q is encrypted as "def").

Figure 6:
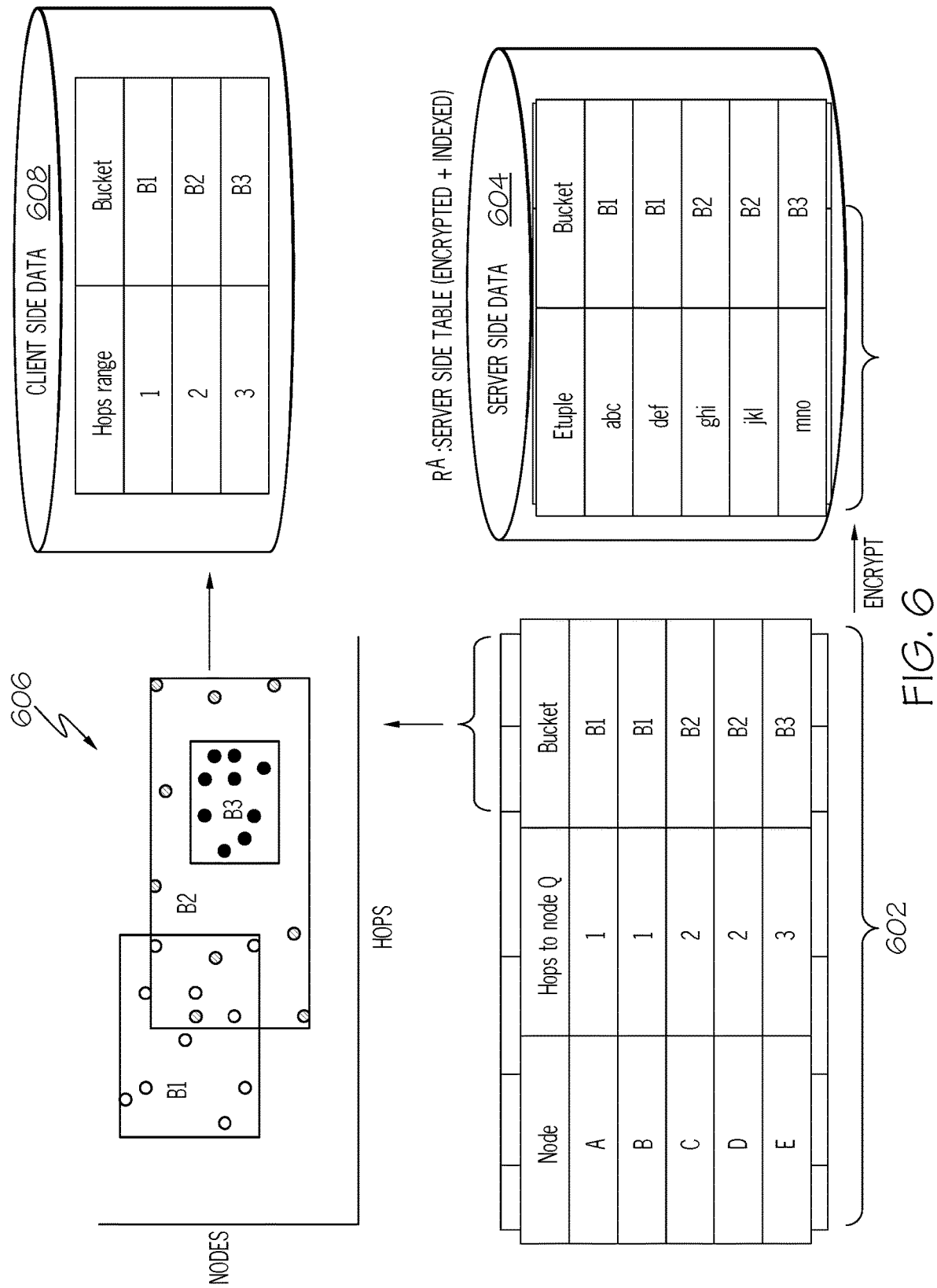
FIG. 6 illustrates a graph bucket embedding depicting bucketized first order metadata from a data graph in accordance with one or more embodiments of the present invention.

With reference now to FIG. 6, a graph bucket embedding 606 is shown depicting bucketized first order metadata from a data graph in accordance with one or more embodiments of the present invention. For example, assume that FIG. 6 is related to the data graph 501 shown in FIG. 5. A first order graph database table 602 shows that data graph 501 has nodes A-E, the number of hops from each of the nodes to query node Q (and thus the topology of the nodes A-E), and the bucket to which node in data graph 501 is assigned based on its topology. The information shown in the first order graph database table 602 is restricted to the trusted client computer (e.g., client computer 301 shown in FIG. 3), and is not shared with the untrusted server (e.g., untrusted remote server 351 shown in FIG. 3).

As shown in graph database table 602, each node is assigned to a bucket (e.g., bucket B1), which is a grouping of nodes according to some defined parameter. In the first order embedding shown in FIG. 6, these groupings are defined by the topology of the nodes in the graph (e.g., how many hops away they are from the query node Q). Only the names of the buckets (B1, B2, B3) and or the encryption of the edge metadata (e.g., abc) is sent to the remote server as server side data 604. However, the trusted client computer is still able to intelligently request a particular bucket, based on knowing the topology of nodes that are assigned to certain buckets. This allows the client computer to utilize such client side data 608 when responding to a request for data from nodes that are within 1, 2, or three hops of the query node Q.

While FIG. 6 describes a first-order topology (e.g., how many hops are between nodes), one or more embodiments utilize a second-order topology as well, which is a task-specific topology. For example, assume that nodes in the data graph 501 represent virtual machines (VM) in a network, which are routinely being instantiated (e.g., created) and deleted on the network. Assume further that the query is for all VMs on the network that are less than two hops from the query node Q, and that are less than an hour old (i.e., have been instantiated within the past 60 minutes).

Figure 7:
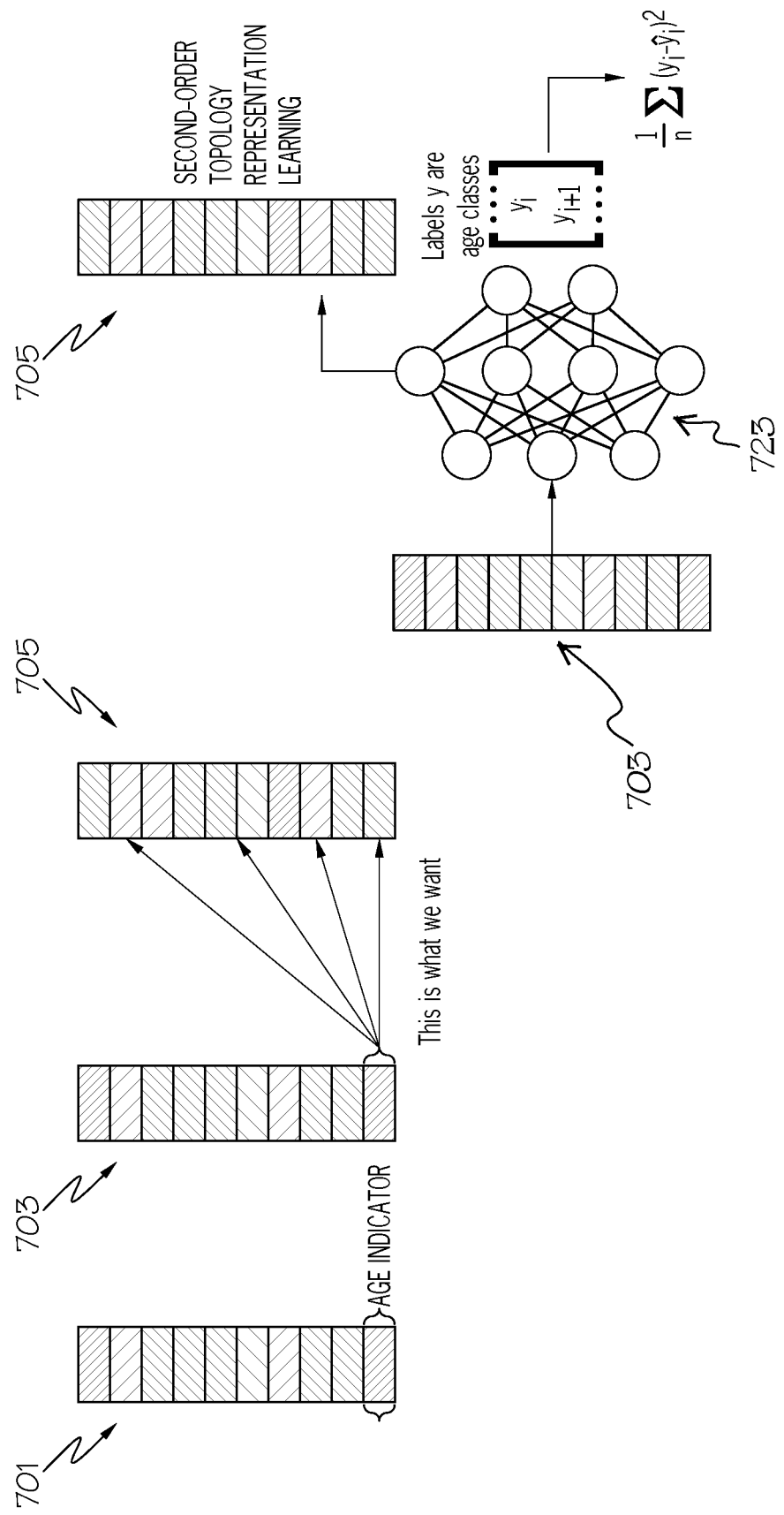
FIG. 7 depicts a generations of a second-order topology vector based on a first-order topology vector in accordance with one or more embodiments of the present invention.

As such, FIG. 7 depicts a generations of a second-order topology vector based on a first-order topology vector in accordance with one or more embodiments of the present invention.

Assume now that a graph neural network (e.g., GNN 1625 shown below in FIG. 16) or a random walk through the graph database captures a wide range of statistical signals from the data graph. These statistical signals allow the system to perform vertex classification for seemingly non-topology-related tasks, by attribute, based on the embeddings of the first-order topology shown in FIG. 6. The topology that reveals the signal of such a classification task is referred to as a second-order topology. This allows the system to extract vectors at later hidden layers as embeddings that indicate the signal more strongly.

For example, assume that the last two entries in a first order topology vector 701 (e.g., for node B in data graph 501) are indicative of the age of the VM that is represented by node B (e.g., an instantiation time, a type of VM that is designed to be automatically deleted within some predefined amount of time, such as 15 minutes, etc.). If two vertices in the data graph are similar (have a small norm) in the last two entries of their respective vectors (e.g., first order topology vector 701 and first order topology vector 703) that describe their respective vertices/nodes, then the two VMs are likely around the same age.

As such, the last two entries of the of one of the two first order topology vectors (e.g., first order topology vector 703) are used to generate a second order topology vector 705 that describes an age of the VM. In one or more embodiments of the present invention, a neural network 723 (e.g., the deep neural network 1223 shown in FIG. 12) creates the second order topology vector. This allows the system to perform range queries based on distances between second order embeddings.

Figure 8:
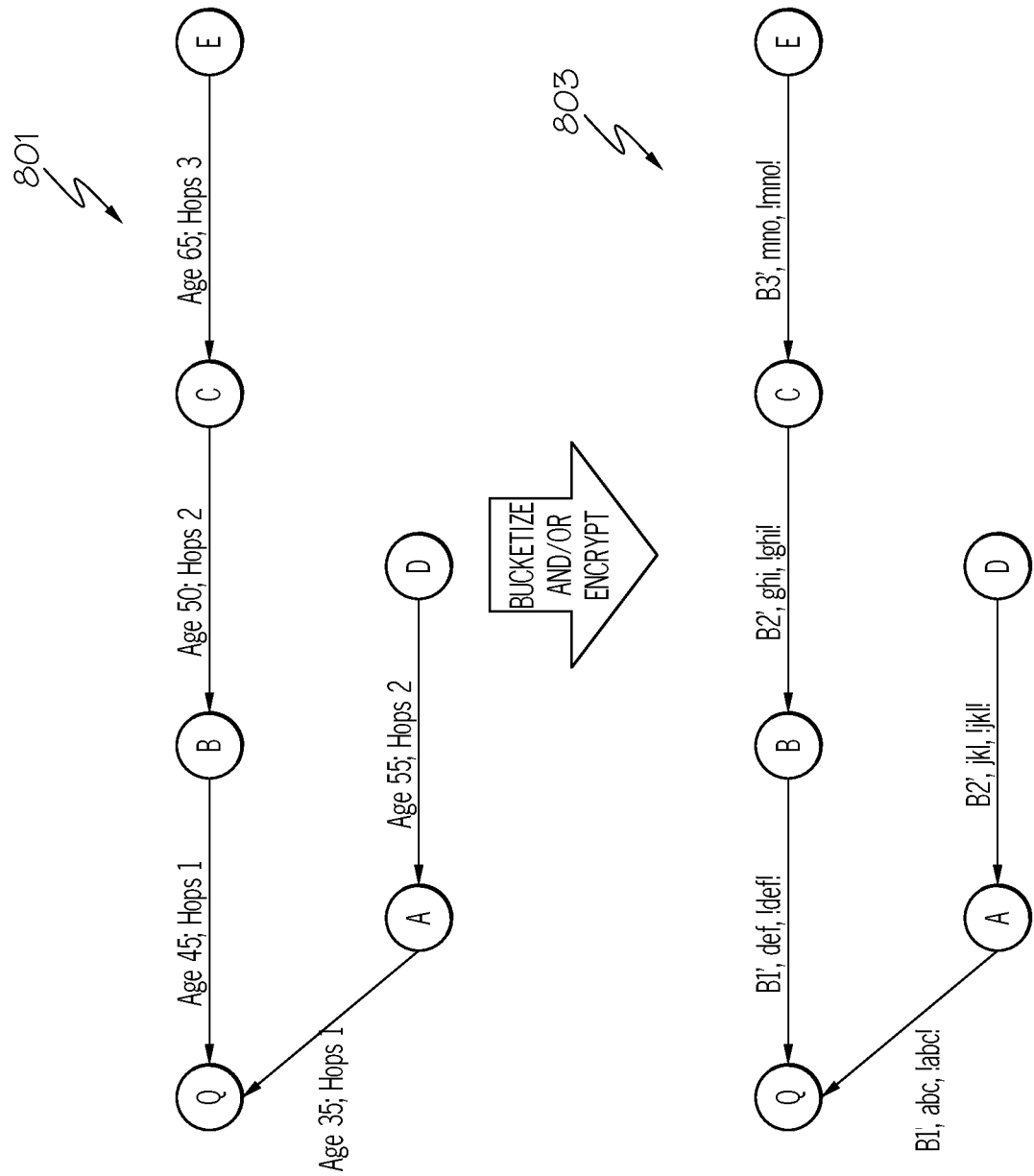
FIG. 8 illustrates a combined first-order and second-order topology of the sparse graph database shown in FIG. 5.

As such, FIG. 8 illustrates a combined first-order and second-order topology of the sparse graph database shown in FIG. 5. As shown in second order data graph 801, the metadata includes by hop topology data and vertex/node (e.g., VM) age described in the edges. This information is bucketized and/or encrypted, as shown in the encrypted second order data graph 803.

Figure 9:
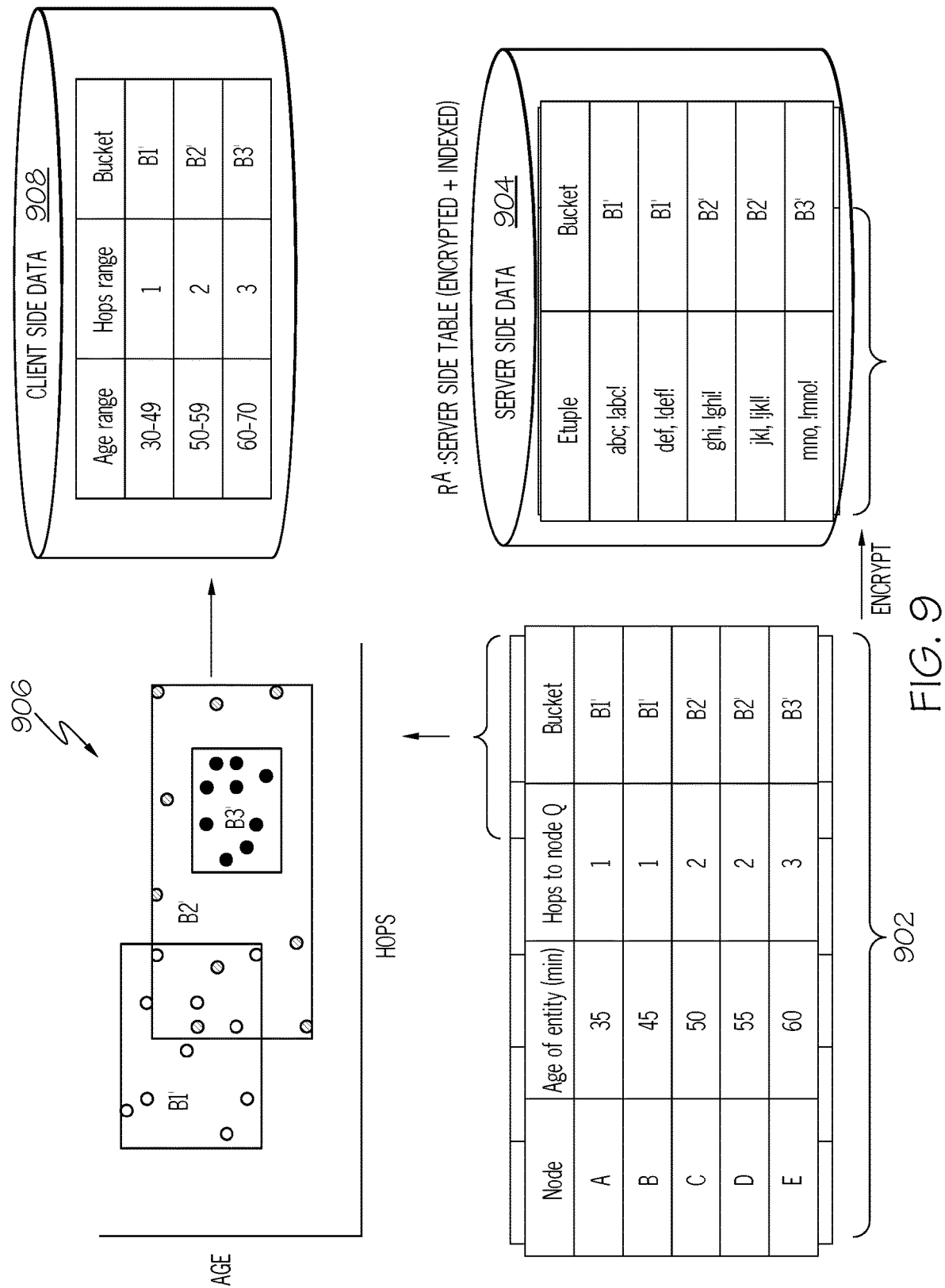
FIG. 9 depicts a graph bucket embedding depicting bucketized second order metadata from a data graph in accordance with one or more embodiments of the present invention.

Thus, FIG. 9 depicts a graph bucket embedding depicting bucketized second order metadata from a data graph in accordance with one or more embodiments of the present invention.

As shown in graph database table 902, each node is assigned to a bucket (e.g., bucket B1), which is a grouping of nodes according to not only the hop topology of the nodes, but also the age of the entity (e.g., a VM) represented by a node. This information from the edges shown in FIG. 8, including the names of the buckets (B1', B2', B3'—as depicted in graph bucket embedding 906) and/or the encryption of the edge metadata (e.g., abc; !abc!) is sent to the remote server as server side data 904. This allows the client computer to utilize such client side data 908 when responding to a request for data from nodes that are of a certain age and are within 1, 2, or three hops of the query node Q.

Figure 10:
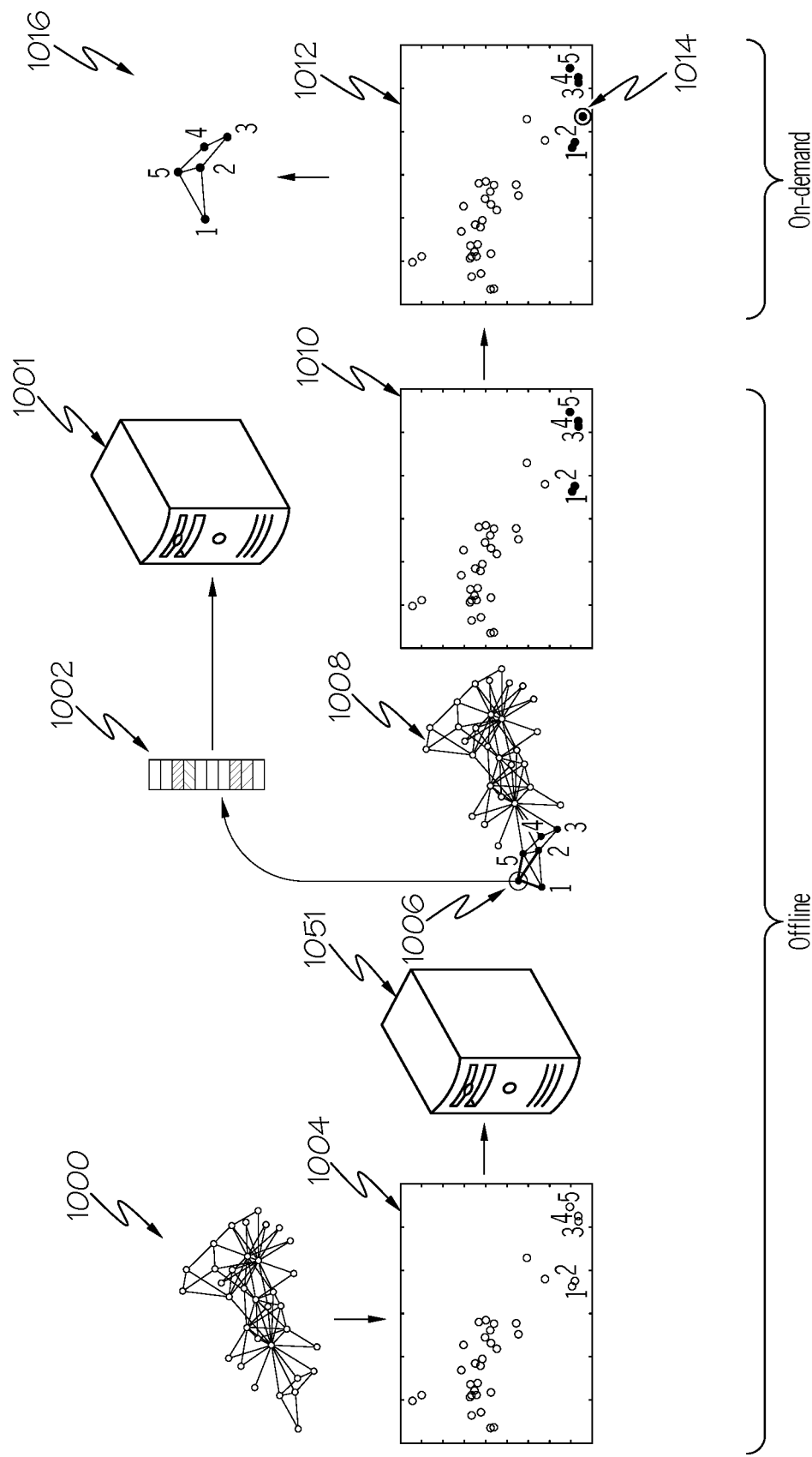
FIG. 10 illustrates another high-level overview of one or more embodiments of the present invention.

With reference now to FIG. 10, another high-level overview of one or more embodiments of the present invention is presented.

Assume that an original data graph 1000 (analogous to the full graph database 400 shown in FIG. 4) has nodes that represent multiple VMs in a network. An original embedding graph 1004 is generated by embedding each of the vertices/nodes using their first-order topology (e.g., nodal hop proximity). These embeddings are sent to an untrusted server 1051 (e.g., a cloud-based server) in the form of the original embedding graph 1004 for storage.

As shown in query graph database 1008, a query node 1006 is added to the original graph database 1000, at a position that is either random, or else is selected based on information about that query node 1006 (e.g., age of VM, type of VM, task being run by that VM, etc.) that is similar to nearby nodes from the original embedding graph 1004. Information about the VM in this query node is stored as a vector 1002, which is stored in a trusted client computer 1001.

As shown in FIG. 10, the vertices that are selected as being proximate to the query node 1006 can be identified as being similar using a community query (e.g., requesting k clusters). The server confirms the k communities using k-means or similar algorithms, in order to identify clusters in the query embedding graph 1010. All steps so far are performed offline (i.e., are not visible to entities other than the trusted client computer 1001).

When a query comes in for node relative to the query node 1006, the trusted client computer 1001 sends the query embedding graph 1010 and the vector 1002 (describing the query node 1006) to the untrusted server 1051. The untrusted server 1051 then generates an answer graph database 1012 from the query embedding graph 1010 and the vector 1002, which includes am embedded node 1014 for the query node 1006.

The untrusted server 1051 is able to recognize the nodes that are in a same bucket as the embedded node 1014, and generate an answer data graph 1016 from these nodes, which includes the five nodes from the original data graph 1000. That is, the untrusted node identifies, based on topology alone and without revealing any sensitive data, that these five nodes are topologically related to the embedded node 1014, and therefore return these five nodes as answer data graph 1016 to the user making the query about nodes related to query node 1006.

Thus, the untrusted server finds community membership of the query node/vertex, and returns other member/relevant nodes/vertices, while never revealing any exact topology or metadata to the untrusted server.

In an embodiment of the present invention, edge metadata is encrypted, but is not bucketized. For example, consider FIG. 11, which presents a variation of the process shown in FIG. 8.

Figure 11:
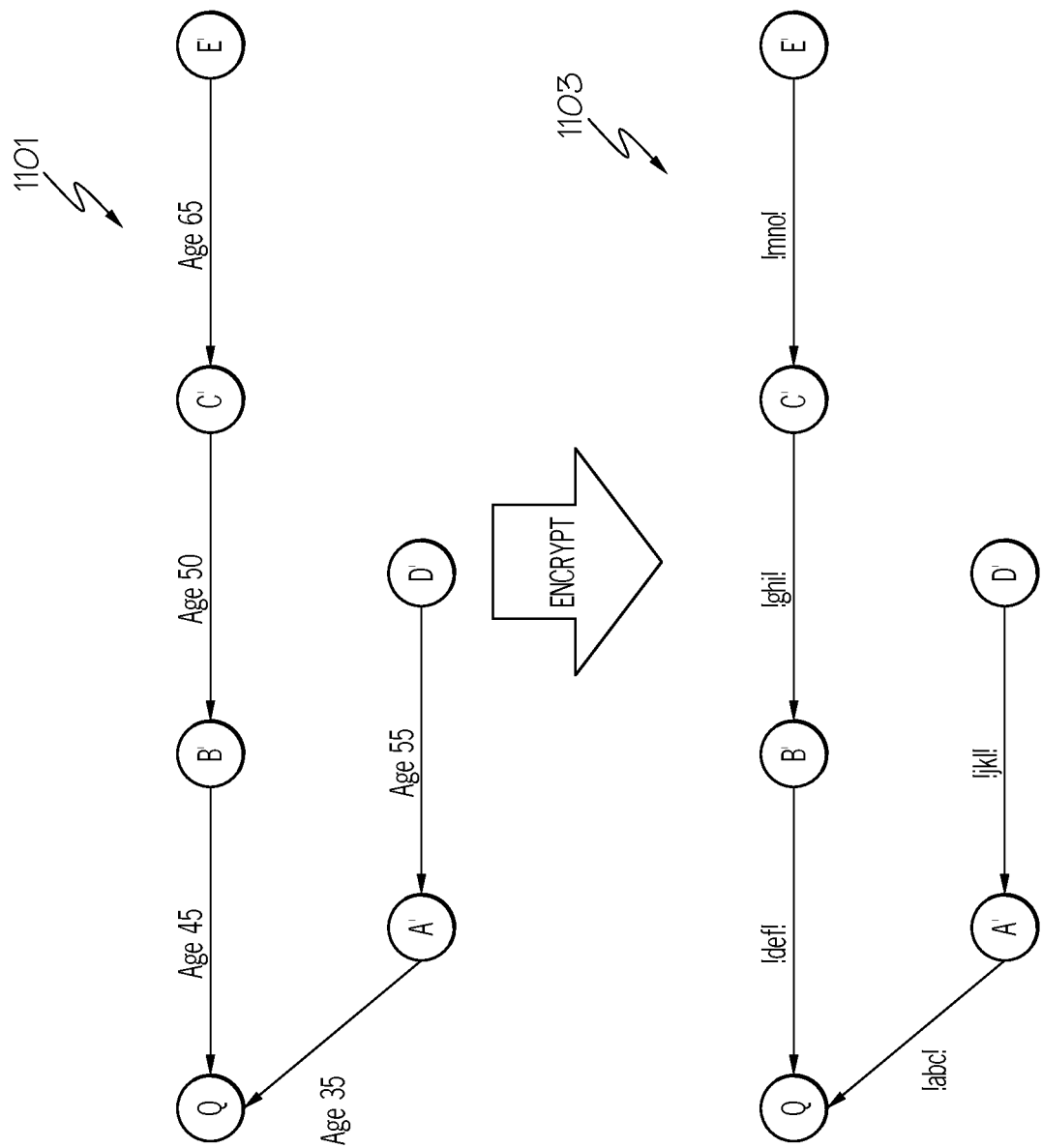
FIG. 11 depicts the graph database introduced in FIG. 5 having edge metadata encrypted without bucketization.

As shown in FIG. 11, the metadata, which describes an age of a VM represented by a starting node of an edge, is encrypted and associated with that edge. As such, the age "45 minutes" describing the age of the VM represented by node B' (from nodes A', B', C', D', and E') in data graph 1101 is encrypted into "!def!" on the corresponding edge in data graph 1103. This simplified embodiment is used below in FIG. 12. However, the processes described in FIG. 12 are also used in one or more other embodiments of the present invention, which use higher order topologies, bucketization, etc. as described herein.

Figure 12:
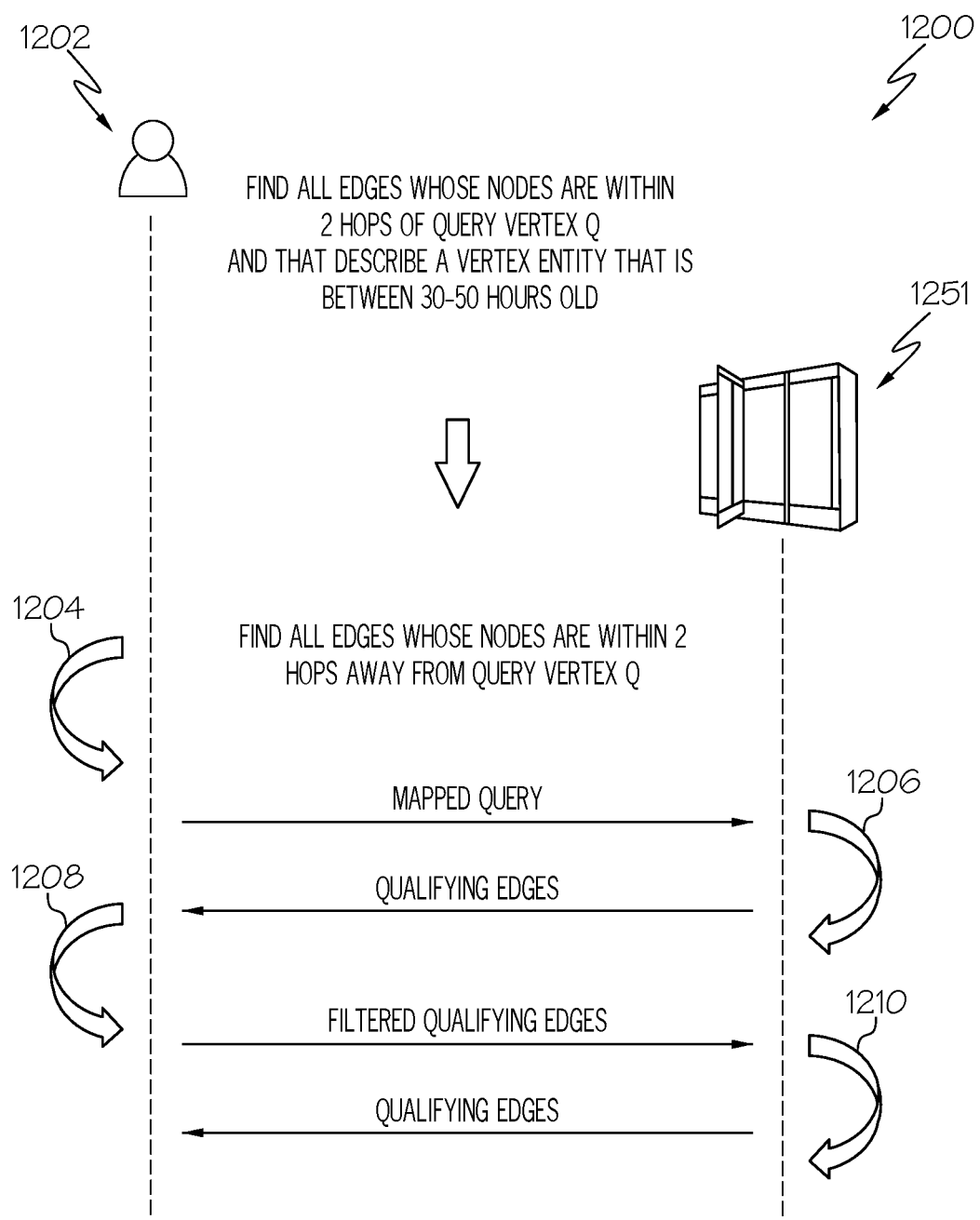
FIG. 12 depicts an exemplary process for responding to a query to a graph database in accordance with one or more embodiments of the present invention.

With reference now to FIG. 12, an exemplary process for responding to a query to a graph database in accordance with one or more embodiments of the present invention is presented in flow-chart 1200. For example, assume that a user 1202 (using a trusted client computer such as computer 101 shown in FIG. 1) wants to conduct a search on the data graph 1103 shown in FIG. 11, in which none of the encrypted edge metadata has been bucketized.

As indicated by line 1204, a query transformation transforms an original query into a query that does not reveal the nature of the original query. For example, if the user 1202 is looking for all edges connected to nodes representing VMs that are between 30 and 50 hours old and that are within two hops of query node Q using an original query ("Find all edges whose nodes are within 2 hops of query vertex Q and that describe a vertex entity that is between 30-50 hours old"), the original query is transformed into "Find all edges whose nodes are within 2 hops away from query vertex Q".

This transformed query is sent to an untrusted remote server 1251 (analogous to the untrusted remote server 151 shown in FIG. 1), which starts a graph traversal across data graph 1103 until it reaches all nodes that are within two hops of query node Q (e.g., reaches node A', node B', node C', and node D'). The untrusted remote server 1251 returns the discovered nodes and encrypted metadata !abc! and !def! and !ghi! and !jkl! to the user client computer, as indicated by arrow 1206.

Back on the trusted client side, the user 1202 decrypts the returned encrypted metadata !abc! and !def! and !ghi! and !jkl! along with an identity of node A', node B', node C', and node D'. The trusted client knows that the only encrypted edge metadata that describes VMs that are between 30 and 50 hours old are !abc! and !def! and !ghi!. As such, the encrypted edge metadata !jkl! and its associated node D' are filtered out of the query by the client 1202 (using a client-side computer, such as client computer 301 shown in FIG. 3), as indicated by line 1208.

As indicated by line 1210, a new query of the data graph 1103 is requested of the remote untrusted server 1251, only asking for nodes A', node B', node C' and their encrypted edge metadata, which is then returned to the user 1202.

In one or more embodiments of the present invention, artificial intelligence in the form of a neural network is used to identify/define a second order topology vector (e.g., see neural network 723 in FIG. 7), and/or to return vertices and their edge metadata that answer a query (e.g., see FIG. 10 and FIG. 12), A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons in certain electronic neural networks are never technically "inhibitory", but are only "excitatory" to varying degrees. In other electronic neural networks, however, electronic neurons are capable of inhibitory signals, which reduce the ability of a follow-on neuron to produce a positive output.

Figure 13:
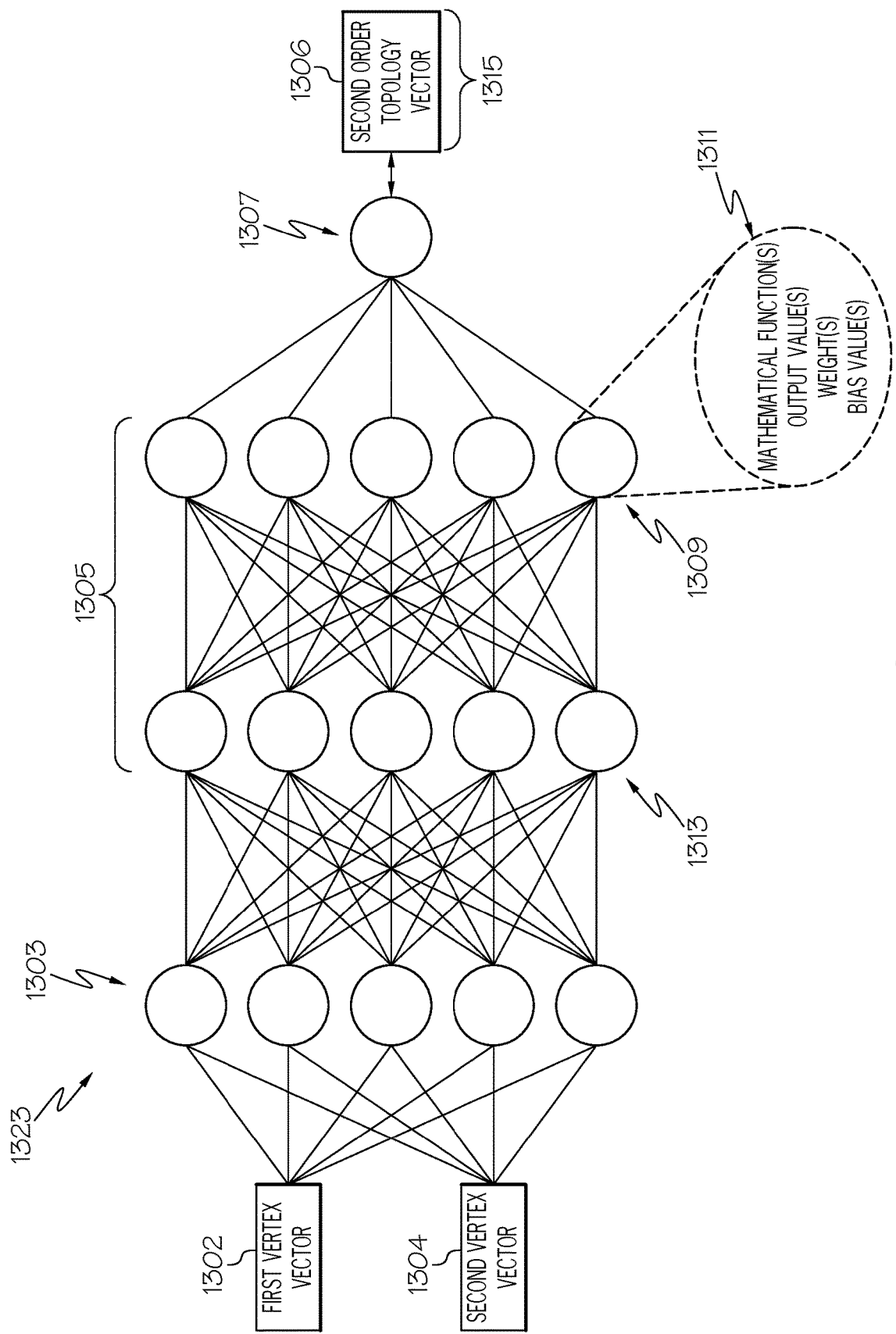
FIG. 13 depicts an overview of a deep neural network (DNN) that is used in one or more embodiments of the present invention.

With reference now to FIG. 13, one type of neural network used in one or more embodiments of the present invention is a deep neural network (DNN), such as the depicted deep neural network (DNN) 1323 (analogous to the machine learning system 123 shown in FIG. 1), as shown in FIG. 13.

In one or more embodiments of the present invention, DNN 1323 is used in one or more embodiments of the present invention when generating a second order topology vector from a first order topology vector, as described in FIG. 7.

In a deep neural network (DNN), neurons are arranged in layers, known as an input layer, hidden layer(s), and an output layer. The input layer includes neurons/nodes that take input data, and send it to a series of hidden layers of neurons, in which neurons from one layer in the hidden layers are interconnected with neurons in a next layer in the hidden layers. The final layer in the hidden layers then outputs a computational result to the output layer, which is often a single node for holding vector information.

With further reference now to FIG. 13, DNN 1323 is used to generate a second order topology vector 1306 based on an input of a first vertex vector 1302 (e.g., the first-order topology vector 701 shown in FIG. 7) and a second vertex vector 1304 (e.g., the first-order topology vector 703 shown in FIG. 7). That is, the DNN 1323 compares the last two entries in the first vertex vector 1302 and the second vertex vector 1304, determines that they are similar for describing a second order topology vector, and generate that second order topology vector 1306 as an output vector 1315 based on an analysis of those last two entries in order to create the second order topology vector 1306 (e.g., a vector that describes an age of a VM, as discussed above).

As shown in FIG. 13, the electronic neurons in DNN 1323 are arranged in layers, known as the input layer 1303, hidden layers 1305, and an output layer 1307. The input layer 1303 includes neurons/nodes that take input data, and send it to a series of hidden layers of neurons (e.g., hidden layers 1305), in which neurons from one layer in the hidden layers are interconnected with neurons in a next layer in the hidden layers 1305. The final layer in the hidden layers 1305 then outputs a computational result to the output layer 1307, which is often a single node for holding vector information. In an embodiment of the present invention, each neuron in the output layer 1307 is associated with a particular output vector 1315.

As just mentioned, each node in the depicted DNN 1323 represents an electronic neuron, such as the depicted neuron 1309. As shown in block 1311, each neuron (including exemplary neuron 1309) includes at least four features: a mathematical function, an output value, a weight, and a bias value.

The mathematical function is a mathematic formula for processing data from one or more upstream neurons. For example, assume that one or more of the neurons depicted in the middle hidden layers 1305 sent data values to neuron 1309. Neuron 1309 then processes these data values by executing the mathematical function shown in block 1311, in order to create one or more output values, which are then sent to another neuron, such as another neuron within the hidden layers 1305 or a neuron in the output layer 1307. Each neuron also has a weight that is specific for that neuron and/or for other connected neurons. Furthermore, the output value(s) are added to bias value(s), which increase or decrease the output value, allowing the DNN 1311 to be further "fine-tuned".

For example, assume that neuron 1313 is sending the results of its analysis of a piece of data to neuron 1309. Neuron 1309 has a first weight that defines how important data coming specifically from neuron 1313 is. If the data is important, then data coming from neuron 1313 is weighted heavily, and/or increased by the bias value, thus causing the mathematical function (s) within neuron 1309 to generate a higher output, which will have a heavier impact on neuron(s) in the output layer 1307. Similarly, if neuron 1313 has been determined to be significant to the operations of neuron 1309, then the weight in neuron 1313 will be increased, such that neuron 1309 receives a higher value for the output of the mathematical function in the neuron 1313. Alternatively, the output of neuron 1309 can be minimized by decreasing the weight and/or bias used to affect the output of neuron 1309. These weights/biases are adjustable for one, some, or all of the neurons in the DNN 1323, such that a reliable output will result from output layer 1307. Such adjustments are alternatively performed manually or automatically.

When manually adjusted, the weights and/or biases are adjusted by the user in a repeated manner until the output from output layer 1307 matches expectations. For example, assume that DNN 1323 is being trained to generate a particular topology vector. As such, when input layer 1303 receives the inputs from a known vertex vector whose last two entries are known to describe an age of a VM described in a graph database, then DNN 1323 (if properly trained by manually adjusting the mathematical function(s), output value(s), weight(s), and biases in one or more of the electronic neurons within DNN 1323) outputs a correct output vector 1315 (e.g., the appropriate second order topology vector 1306) to the output layer 1307.

When automatically adjusted, the weights (and/or mathematical functions) are adjusted using "back propagation", in which weight values of the neurons are adjusted by using a "gradient descent" method that determines which direction each weight value should be adjusted to.

Figure 14:
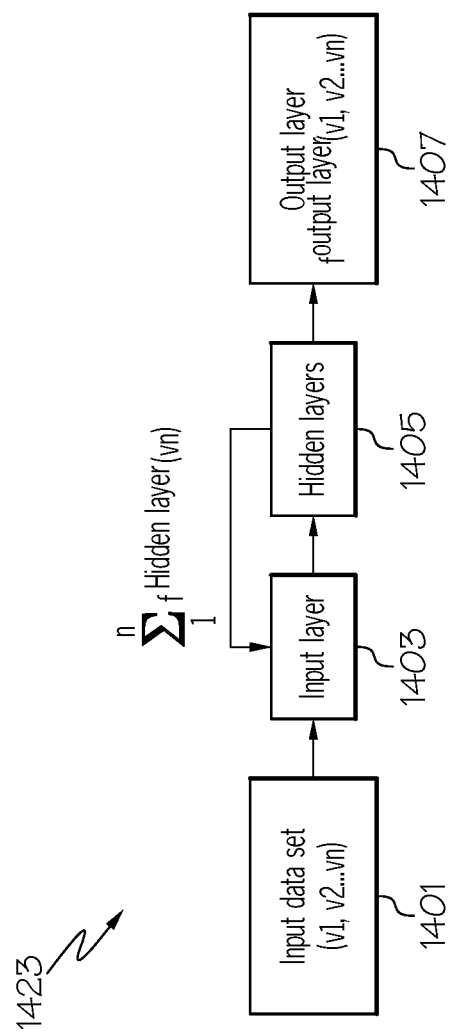
FIG. 14 illustrates an exemplary recurrent neural network used in one or more embodiments of the present invention.

With reference now to FIG. 14, an exemplary Recurrent Neural Network (RNN) 1423, which uses a form of back propagation, is used to generate second order vertex vectors in one or more embodiments of the present invention.

As shown in FIG. 14, an input data set 1401 is a series of vertex vectors (e.g., vertex vectors, such as discussed in FIG. 7), depicted as v1, v2 . . . vn. Input data set 1401 is entered into an input layer of RNN 1423, which passes the data from input data set 1401 to an input layer 1403, and then on to hidden layers 405 for processing. As the name recurrent neural network infers, an output from the hidden layers 1405 for a current vector (e.g., $f(v_1)$) is fed back to the input layer 1403, such that the current output for the current vector $f(v_1)$ is combined with a next input vector (e.g., $v_2$) to create a new output from the hidden layers 1405 (e.g., $f(v_1+v_2)$). This process repeats until all vectors from the input data set 1401 and their precursive processing results are processed, resulting in an output to the output layer 1407, shown as $f^{output\ layer}$ ($v_1, v_2 \ldots v_n$).

In one or more embodiments of the present invention, a convolutional neural network (CNN) or a graph neural network (GNN) is used to identify and return vertices and/or metadata from a graph database, as described in FIG. 10 and FIG. 12.

A CNN is similar to a DNN in that both utilize interconnected electronic neurons, such as those described in FIG. 13. However, a CNN is different from a DNN in that 1) a CNN has neural layers whose sizes are based on filter sizes, stride values, padding values, etc. (see FIG. 15) and 2) utilize a convolution scheme to analyze binary data (see FIG. 16). A CNN gets its "convolutional" name based on a convolution (i.e., a mathematical operation on two functions to obtain a result) of filtering and pooling binaries data (a mathematical operation on two functions) in order to generate a predicted output (obtain a result).

CNNs are normally used to evaluated images in order to identify unknown objects depicted in those images. However, one or more embodiments of the present invention provides a new, useful, and nonobvious use of a CNN to evaluate binaries from vectors that describe vertices and/or edge metadata in a graph database.

Figure 15:
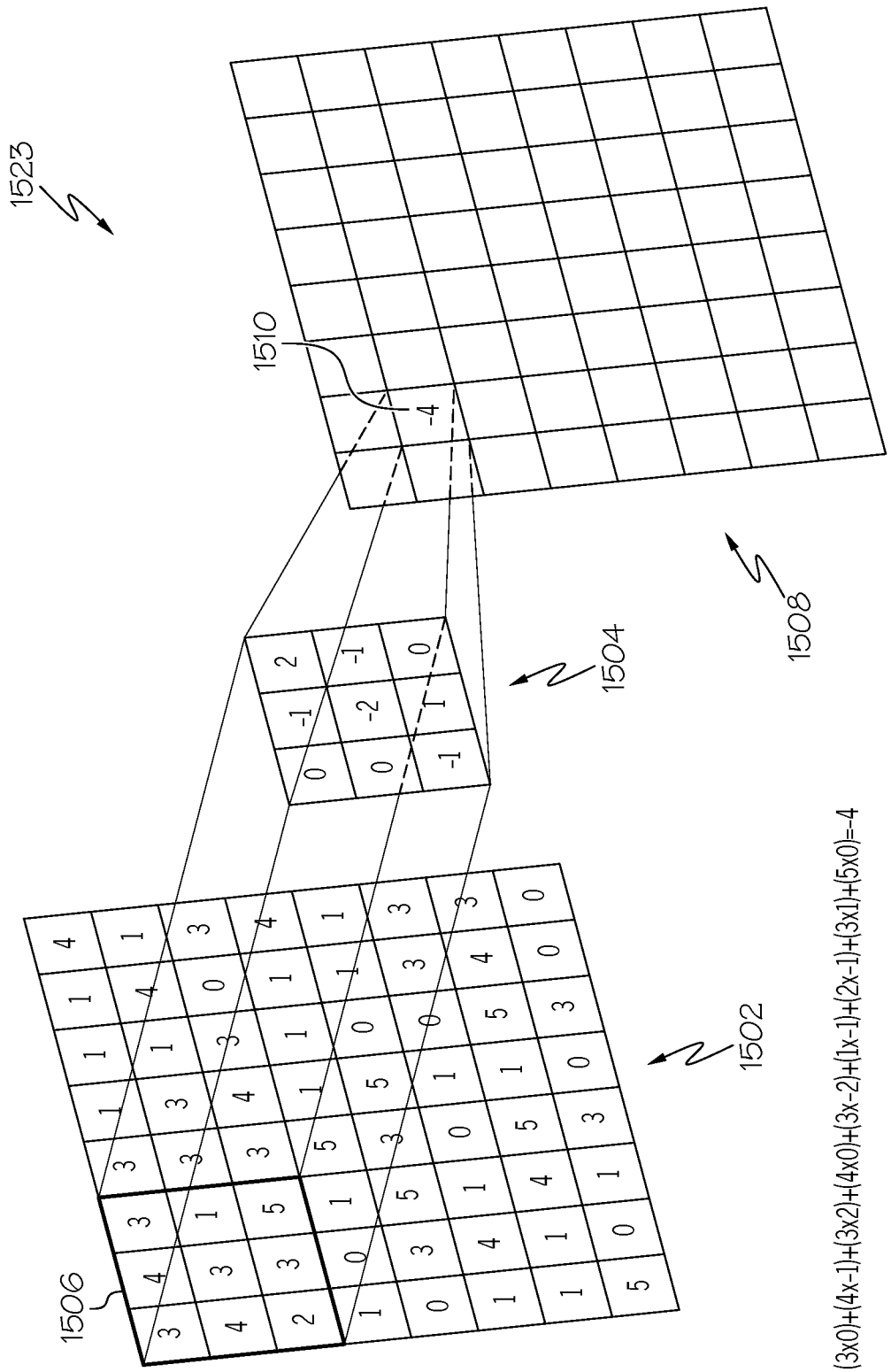
FIG. 15 and FIG. 16 illustrate a convolutional neural network (CNN) that is used in one or more embodiments of the present invention.
Figure 16:
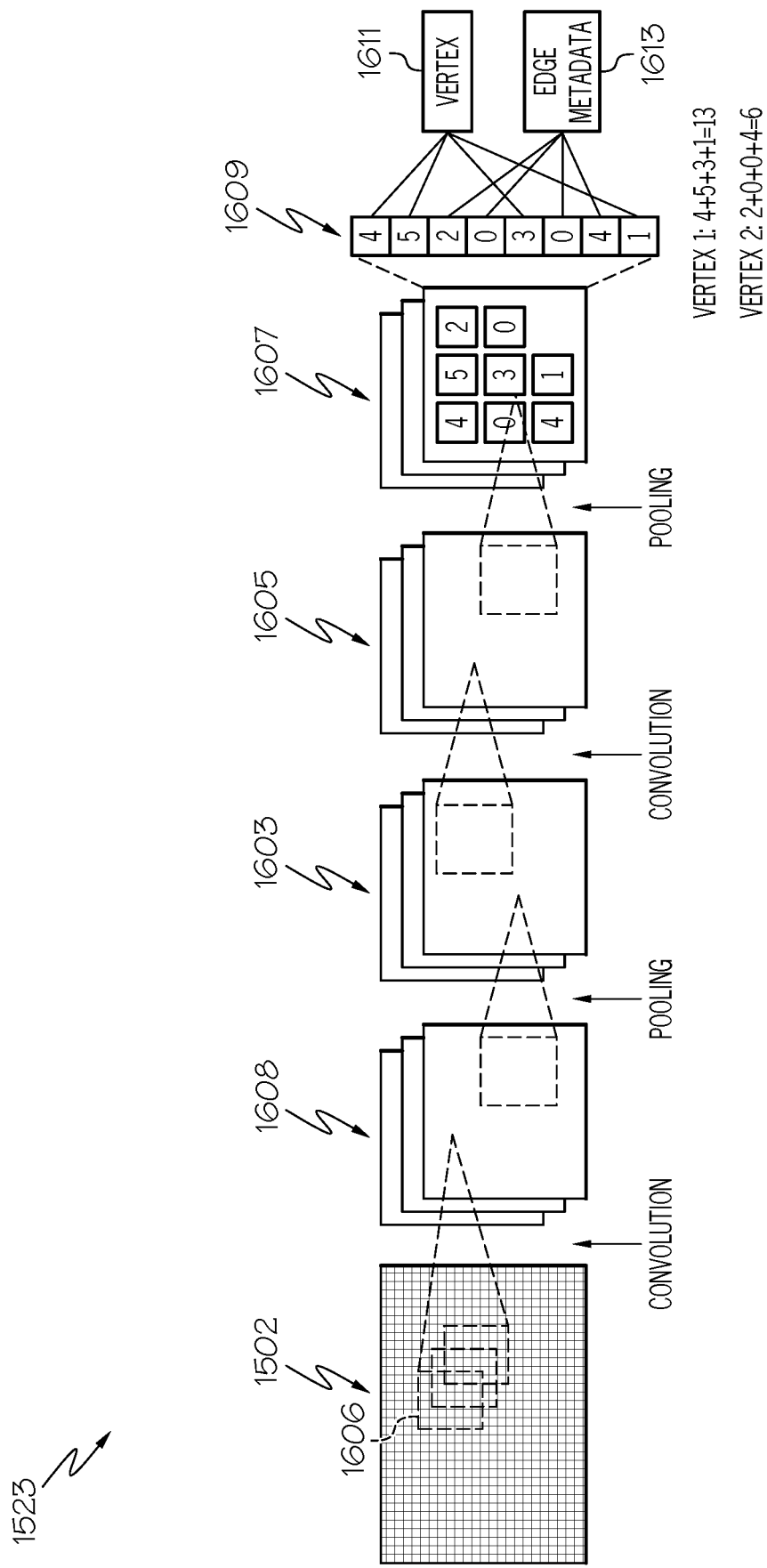

As described herein, a CNN process includes 1) a convolution stage (depicted in detail in FIG. 15), followed by a 2) pooling stage and a classification stage (depicted in FIG. 16).

With reference now to FIG. 15, a convolution scheme to analyze operating system binaries is presented in a CNN convolution process performed by a CNN 1523. As shown in FIG. 15, binary data from vertex vectors and/or edge metadata populates an input table 1502. Each cell in the input table 1502 represents a value (e.g., a value between 0 and 9) that describe different vertices and/or edge metadata (referred to collectively as binary sets). A subset of the input table 1502 is associated with a filter 1504. That is, filter 1504 is matched to a same-sized subset of binary sets (e.g., binaries subset 1506) by sliding the filter 1504 across the input table 1502. The filter 1504 slides across the input grid at some predefined stride (i.e., one or more binary units, each of which is depicted as a single cell). Thus, if the stride is "1", then the filter 1504 slides over in increments of one (column) of binary sets. In the example shown in FIG. 15, this results in the filter 1504 sliding over the subset of binary sets shown as binaries subset 1506 (3,4,3,4,3,1,2,3,5 when read from left to right for each row) followed by filter sliding over the subset of binary sets just to the right of (4,3,3,3,1, 3,2,5,3). If the stride were "2", then the next subset of binary sets that filter 1504 would slide to would be (3,3,1,1,3,3,5, 3,4), etc.

Filter 1504 is applied against each binaries subset using a mathematical formula. That is, the values in the filter 1504 are added to, subtracted to, multiplied by, divided by, or otherwise used in a mathematical operation and/or algorithm with the values in each subset of binary sets. For example, assume that the values in filter 1504 are multiplied against the binary values shown in binaries subset 1506 ((3x0)+ (4x-1)+(3x2)+(4x0)+(3x-2)+(1x-1)+(2x-1)+(3x1)+(5x0)) to arrive at the value of −4. This value is then used to populate feature map 1508 with the value of −4 in cell 1510. This value of −4 thus describes a particular portion of the graph database, based on the vectors that represent vertices and edge metadata from that portion of the graph database.

In one or more embodiments embodiment, the convolution step also includes use of an activation function, which transforms the output of the convolution operation into another value. One purpose of the use of an activation function is to create nonlinearity in the CNN. A choice of specific activation function depends on an embodiment. Popular choices of an activation function include a rectified linear unit (ReLU), a leaky ReLU, a sigmoid function, a tanh function, and so on.

In an embodiment, each subset of binary sets uses a same filter. However, in one or more embodiments, the filter used by each subset of binary sets is different, thus allowing a finer level of granularity in creating the feature map.

With reference now to FIG. 16, the pooling stage and a classification stage (as well as the convolution stage) of a CNN 1523 during inference processing is depicted. That is, once the CNN is optimized by adjusting the stride of movement of the binaries subset 1506 (see FIG. 15), and/or by adjusting the filter 1504 shown in FIG. 15, then it is trusted to be able to recognize similar graph database binaries. This optimized CNN is then used to infer (hence the name inference processing) which operating system created the compiled binaries shown in input table 1502.

Thus, as shown in FIG. 16, assume that binary sets from input table 1502 from a graph database are used as inputs to CNN 1523, using a CNN that has been previously defined and optimized to recognize vectors and/or edge metadata in graph databases. Assume further that a series of binaries subsets, including the binaries subset 1606 (analogous to binaries subset 1506 shown in FIG. 15) are convolved (using the process described in FIG. 15), thus resulting in a set of feature maps 1608 (analogous to feature map 1508 shown in FIG. 15). Once the feature maps 1608 are generated, they are pooled into smaller pooled tables 1603, in order to reduce the dimensionality of the values, thereby reducing the number of parameters and computations required in the CNN process. Once these pooled tables 1603 are created, they themselves are then convoluted to create new (and even more compressed) feature maps 1605, which are then pooled to create even more compressed pooled tables 1607.

The pooled tables 1607 (which in an embodiment is actually a single table) is "unrolled" to form a linear vector, shown in FIG. 16 as a fully connected layer 1609, which provides a prediction output, such as the predicted vertex 1611 and the predicted edge metadata 1613, which are predicted to provide an answer to the query described in FIG. 10 and FIG. 12.

In one or more embodiments of the present invention, a graph neural network (GNN) is used to identify an answer to a query that includes one or more vertices from a graph database and metadata from one or more edges in the graph database. The process used in a GNN is similar to that of the CNN described in FIG. 15 and FIG. 16. The difference between a GNN and a CNN is that a GNN uses the topology, nodes, and edges directly from a graph database, and maps different sections of the graph database in a convolutional manner similar to that used by a CNN.

Figure 17:
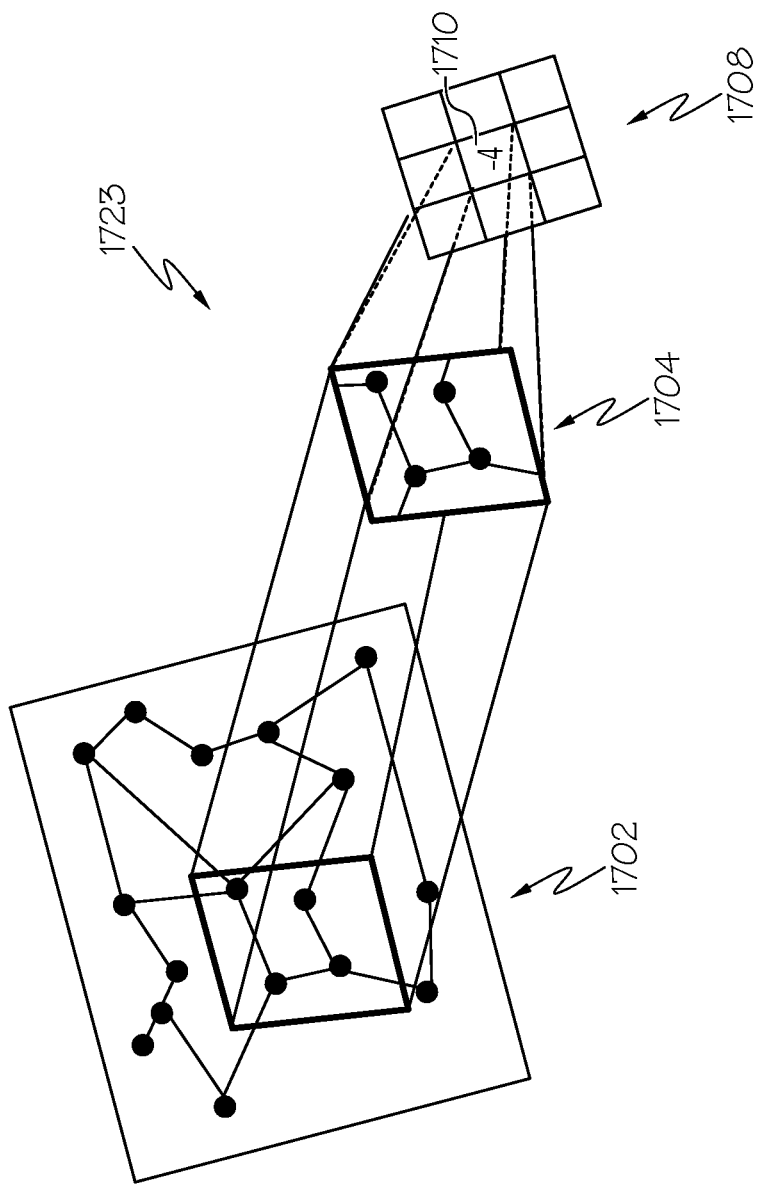
FIG. 17 depicts a high-level overview of a graph neural network (GNN) that is used in one or more embodiments of the present invention.

With reference then to FIG. 17, an exemplary GNN 1723 that is used in one or more embodiments of the present invention to answer a query is depicted.

Rather than using an input table of binaries (such as input table 1502 shown in FIG. 15), GNN 1723 directly analyzes an input graph 1702 that is a graph database. A filter 1704 slides/strides across the input graph 1702 to create a GNN map 1708, similar to the process describe in FIG. 15 for a CNN. The various strides by the filter 1704 are then convoluted using a similar process to that describe in FIG. 16 to identify the vector and/or edge metadata that answer the query. That is, the GNN 1723 uses both a graphical topology, as well as underlying features of vertices and edges, to evaluate each part of the input graph 1702 as defined by the filter 1704.

While the description above describes the use of a DNN, RNN, CNN, or GNN when performing certain functions associated with the present invention, in one or more embodiments of the present invention any type of machine learning (artificial intelligence) can be used to perform described functions associated with the present invention.

Figure 18:
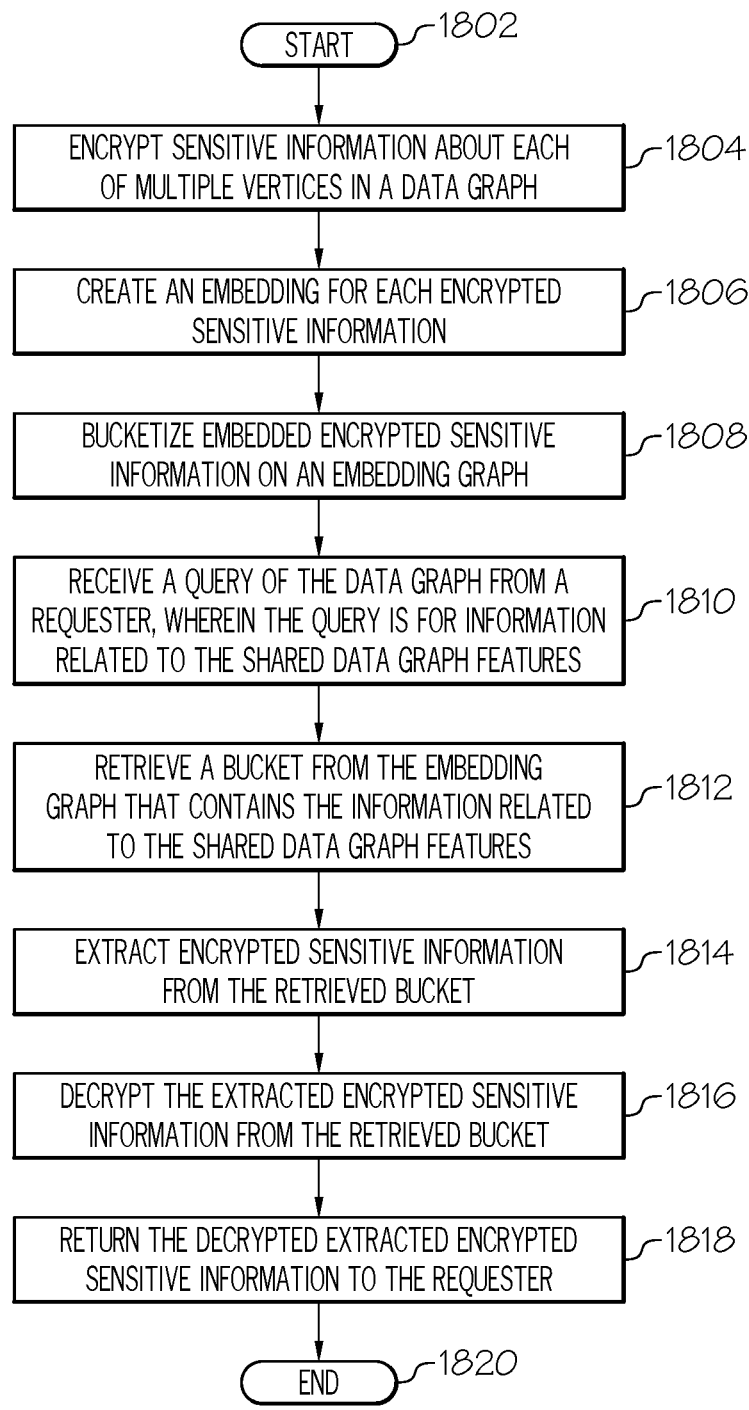
FIG. 18 is a high-level flow-chart of one or more operations performed in one or more embodiments of the present invention.

With reference now to FIG. 18, a high-level flow-chart of one or more operations performed in one or more embodiments of the present invention for secure query processing is presented.

After initiator block 1802, one or more processors encrypt sensitive information about each of multiple vertices in a data graph, as described in block 1804. As described herein, such sensitive information is a set of metadata information that describes connections to graph vertices and graph edges in the data graph and/or a topology of nodes in the data graph.

As described in block 1806, the processor(s) create an embedding for each encrypted sensitive information, as described in the figures herein.

In one or more embodiments of the present invention, the embedded encrypted sensitive information clusters vertices, which are from the data graph and that are bucketized, have shared data graph features that are within a predefined range.

For example, and in one or more embodiments of the present invention, if two vertices are within three hops from one another, then they are defined as being within a predefined range of "less than four hops from one another", which are their shared data graph features.

In another example, and in one or more embodiments of the present invention, assume that a length of an edge that connects two vertices in a data graph is dependent upon how closely related the two vertices are. For example, if a first vertex represents a virtual machine (VM) created by entity A, and a second vertex represents another VM created by entity A, then the two VMs are deemed to be closely related, since they were created by the same entity A, and thus the length of the edge that connects them (i.e., the topology of the data graph as described by the edges), will be short. However, if a first vertex represents a virtual machine (VM) created by entity A, and a second vertex represents another VM created by different entity B, then the two VMs are deemed to be less closely related than if they were created by the same entity, and thus the length of the edge that connects them (i.e., the topology of the data graph as described by the edges), will be longer than the edge between two vertices representing VMs that were both created by entity A. Thus, an example of a predefined range of the shared data graph features would be "an edge between two vertices that is less than three distance units apart", where distance units are defined by a quantity of pixels on a display, relative distances between vertices in a data graph, etc. In another example, the predefined range of the shared data graph features (edge length) would be "edges that have a length that is less than all other edges in the data graph".

In another example, the predefined range of the shared data graph features are not first-order data graph features (e.g., first-order topology such as hops numbers, edge lengths, etc.), but rather are second-order data graph features (e.g., data content of vertices, as identified according to their first-order topology, as described in FIG. 7. Thus, and in one or more embodiments of the present invention, if two vertices contain data that describes an age of a virtual machine (VM), and a first vertex in a data graph contains the age data "5 minutes" for a first VM, and a second vertex in a data graph contains the age data "6 minutes" for a second VM, then if the predefined range is "two virtual machines whose ages are within 2 minutes of each other", then the first vertex and the second vertex have shared data graph features that are within this predefined range.

As described in block 1808, the processor(s) bucketize embedded encrypted sensitive information on an embedding graph (see exemplary FIG. 6 and FIG. 9). As described herein, in one or more embodiments of the present invention, bucketizing the embedded encrypted sensitive information clusters vertices from the graph database that have shared data graph features.

As described in block 1810, the processor(s) receive a query of the data graph from a requester, where the query is for information related to the shared data graph features. (See FIG. 12.)

As described in block 1812, the processor(s) retrieve a bucket from the embedding graph that contains the information related to the shared data graph features.

As described in block 1814, the processor(s) extract encrypted sensitive information from the retrieved bucket using the processes described herein.

As described in block 1816, the processor(s) decrypt the extracted encrypted sensitive information from the retrieved bucket, and return the decrypted extracted encrypted sensitive information to the requester, as described in block 1818.

The flow-chart ends at terminator block 1820.

In one or more embodiments of the present invention, the query is a range query on a set of vertices in the data graph, such as a number of hops from a query node, the metadata from the edges in the graph database, etc.

In one or more embodiments of the present invention, the embedding graph is stored on an untrusted server. In one or more embodiments of the present invention, this untrusted server is part of a cloud of remote servers.

In one or more embodiments of the present invention, the embedding for each encrypted sensitive information is initially based on a first-order embedding. In one or more embodiments of the present invention, this first-order embedding is based on a graph topology of vertices in the data graph (i.e., the positions of the nodes on the data graph). In one or more embodiments of the present invention, the embedding for each encrypted sensitive information is further based on a second-order embedding that is based on a particular task that is related to the query (e.g., edge metadata that describes an age of entities represented by nodes in the graph database).

In one or more embodiments of the present invention, bucketizing the embedded encrypted sensitive information on the embedding graph assigns vertices within a predetermined graphical distance into a same bucket (see exemplary FIG. 6 and FIG. 9).

In one or more embodiments of the present invention, bucketizing the embedded encrypted sensitive information on the embedding graph assigns vertices within a predetermined quantity of vertex hops from one another into a same bucket (see exemplary FIG. 6 and FIG. 9).

Besides considering node hops when answering a query of a data graph, one or more embodiments of the present invention also evaluate a number of hops between servers that host portions of a graph database. That is, by optimizing which nodes/edges are returned to a query, then the number of different servers that host a distributed dense graph database is reduced (see FIG. 3).

Figure 19:
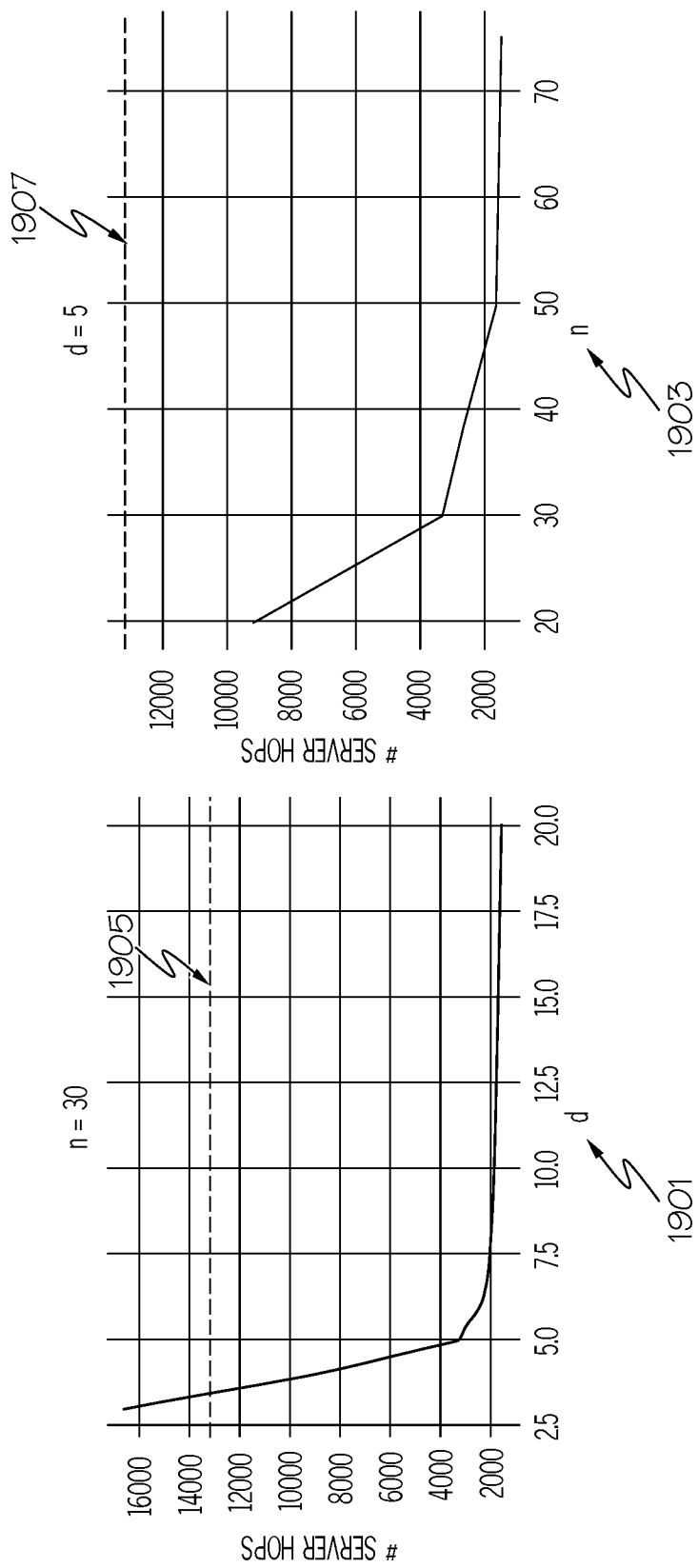
FIG. 19 illustrates a reduction in a number of server hops required to respond to a graph node query, and thus dramatically improving the method thereof over the prior art, in accordance with one or more embodiments of the present invention.

As such, FIG. 19 illustrates a reduction in a number of server hops required to respond to a graph node query, and thus dramatically improving the method thereof over the prior art, in accordance with one or more embodiments of the present invention.

Using one or more embodiments of the present invention, results of an embedding quality ablation study provided evidence of the improvement over the prior art when securely responding to a query of a dense distributed graph database. The results showed an improvement of the quality of embedding as it affects retrieval/filtering speed performance.

In order to test the effect of vertex embedding on query completion time for distributed graph databases, a data graph was partitioned such that hops between servers are minimized due to the nodal search pathways that are minimized/optimized using the bucketization process described herein. The test included using a 3-server distributed graph database (see FIG. 4) and a query of "return all 5 (or fewer)-hop away neighbors from a randomly selected vertex".

From a random partition, the number of server hops averaged at around 13150 (line 1905 on graph 1901 shown in FIG. 19). However, the present invention reduced these server hops to less than 2000, as shown in graph 1901, even when the distance to the answering nodes reached up to 20 hops from the query node.

As shown in graph 1903, in which the number of server hops still averaged around 13150 (line 1907 on graph 1903), increasing the number of uniform random walks through the dense distributed graph database likewise resulted in a dramatic decrease in the number of server hops required to respond to the query of the graph database when the presently described bucketization of vertex data and/or edge metadata is performed.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 20:
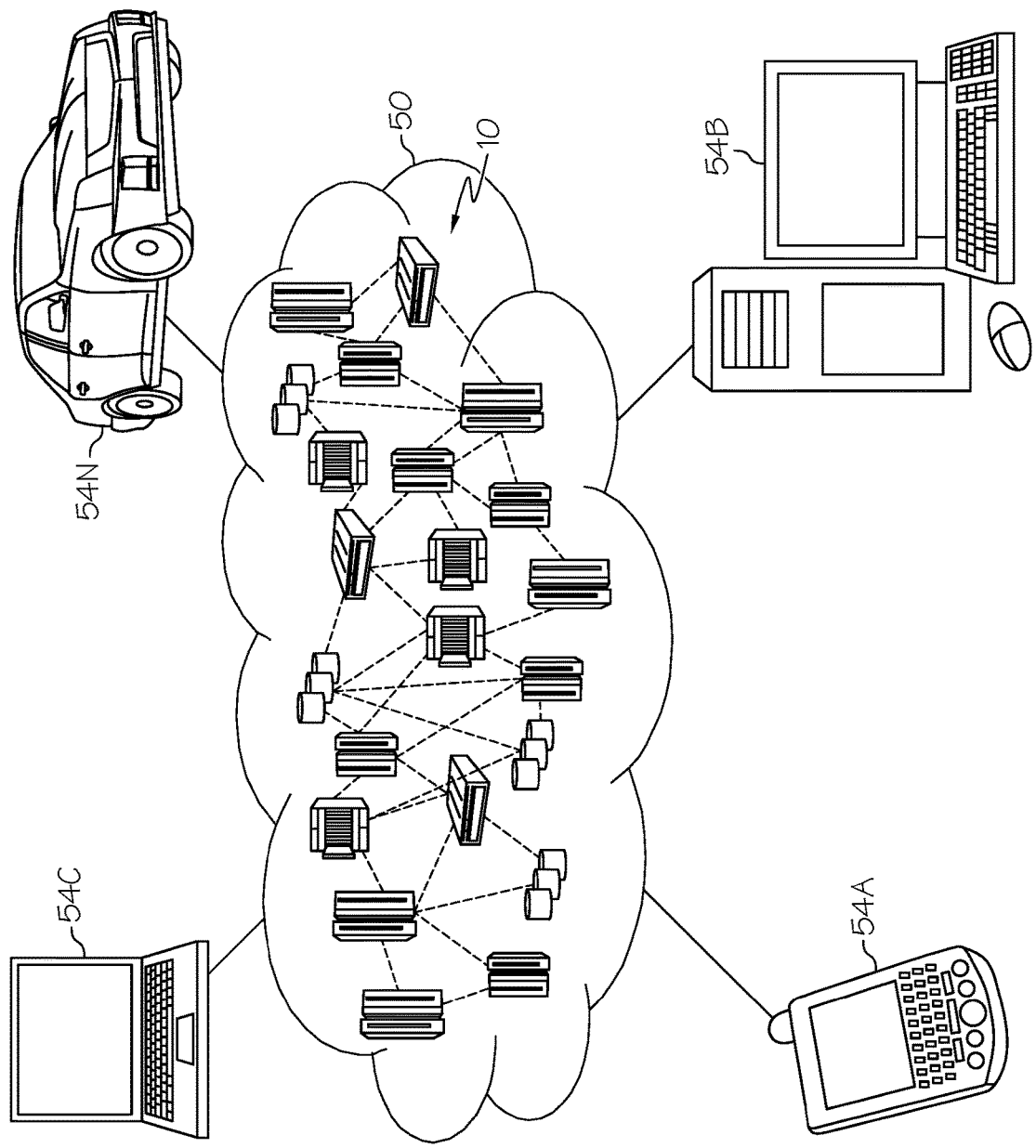
FIG. 20 depicts a cloud computing environment according to an embodiment of the present invention.

Referring now to FIG. 20, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 20 are intended to be illustrative only and that computing nodes 10 and cloud computing environment 50 can communicate with any type of computerized device over any type of network and/or network addressable connection (e.g., using a web browser).

Figure 21:
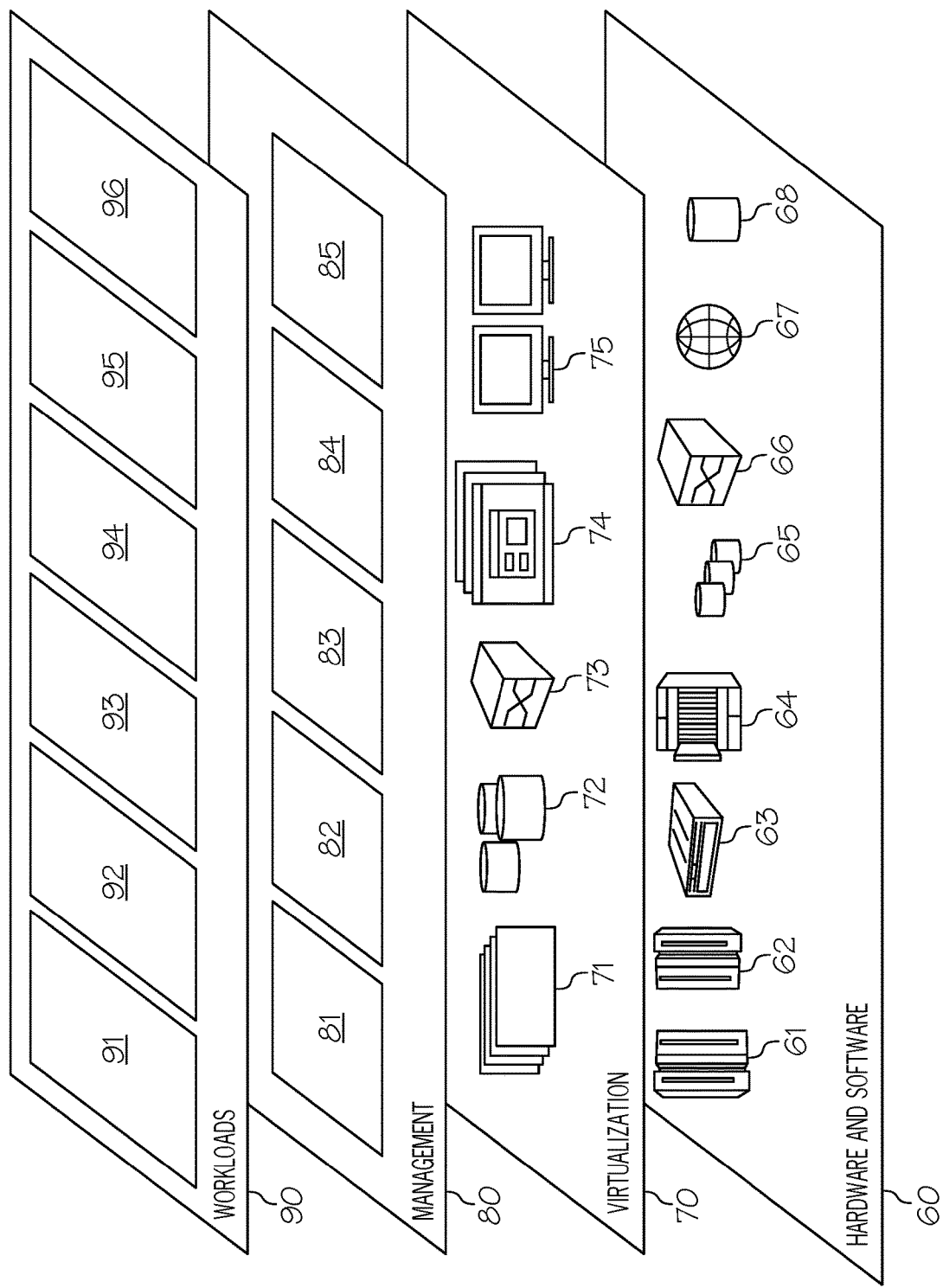
FIG. 21 depicts abstraction model layers of a cloud computer environment according to an embodiment of the present invention.

Referring now to FIG. 21, a set of functional abstraction layers provided by cloud computing environment 50 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and secure graph database query processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for secure query processing, the method comprising:
    creating, by one or more processors, embeddings for encrypted sensitive information about vertices in a data graph;
    bucketizing, by one or more processors, the embedded encrypted sensitive information on an embedding graph, wherein bucketizing the embedded encrypted graph, wherein bucketizing the embedded encrypted sensitive information clusters vertices from the data graph that have shared data graph features;
    receiving, by one or more processors, a query of the data graph from a requester, wherein the query is for information related to the shared data graph features;
    retrieving, by one or more processors, a bucket from the embedding graph that contains the information related to the shared data graph features; and
    extracting, by one or more processors, encrypted sensitive information from the retrieved bucket.

2. The method of claim 1, further comprising:
    decrypting, by one or more processors, the extracted encrypted sensitive information from the retrieved bucket; and
    returning, by one or more processors, the decrypted extracted encrypted sensitive information to the requester.

3. The method of claim 1, wherein the encrypted sensitive information is a set of metadata information that describes connections to graph vertices and graph edges in the data graph.

4. The method of claim 1, wherein the query is a range query on a set of vertices in the data graph.

5. The method of claim 1, wherein the embedding graph is stored on an untrusted server.

6. The method of claim 5, wherein the untrusted server is part of a cloud of remote servers.

7. The method of claim 1, wherein creating the embeddings for the encrypted sensitive information is initially based on a first-order embedding.

8. The method of claim 7, wherein the first-order embedding is based on a graph topology of vertices in the data graph.

9. The method of claim 7, wherein creating the embeddings for the encrypted sensitive information is further based on a second-order embedding that is based on a particular task that is related to the query.

10. The method of claim 1, wherein bucketizing the embedded encrypted sensitive information on the embedding graph assigns vertices within a predetermined graphical distance into a same bucket.

11. The method of claim 1, wherein bucketizing the embedded encrypted sensitive information on the embedding graph assigns vertices within a predetermined quantity of vertex hops from one another into a same bucket.

12. The method of claim 1, wherein bucketizing the embedded encrypted sensitive information clusters vertices from the graph database that have shared data graph features that are within a predefined range.

13. A computer program product comprising a computer readable storage medium having program code embodied therewith, wherein the computer readable storage medium is not a transitory signal per se, and wherein the program code is readable and executable by a processor to perform a method comprising:
    creating embeddings for encrypted sensitive information about vertices in a data graph;
    bucketizing the embedded encrypted sensitive information on an embedding graph, wherein bucketizing the embedded encrypted sensitive information clusters vertices from the data graph that have shared data graph features;
    receiving a query of the data graph from a requester, wherein the query is for information related to the shared data graph features;
    retrieving a bucket from the embedding graph that contains the information related to the shared data graph features; and extracting encrypted sensitive information from the retrieved bucket.

14. The computer program product of claim 13, wherein the encrypted sensitive information is a set of metadata information that describes connections to graph vertices and graph edges in the data graph together with a set of labels.

15. The computer program product of claim 13, wherein the embedding graph is stored on an untrusted server.

16. The computer program product of claim 13, wherein the program code is provided as a service in a cloud environment.

17. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

creating embeddings for encrypted sensitive information about vertices in a data graph;

bucketizing the embedded encrypted sensitive information on an embedding graph, wherein bucketizing the embedded encrypted sensitive information clusters vertices from the data graph that have shared data graph features;

receiving a query of the data graph from a requester, wherein the query is for information related to the shared data graph features;

retrieving a bucket from the embedding graph that contains the information related to the shared data graph features; and extracting encrypted sensitive information from the retrieved bucket.

18. The computer system of claim 17, wherein the encrypted sensitive information is a set of metadata information that describes connections to graph vertices and graph edges in the data graph together with a set of labels.

19. The computer system of claim 17, wherein creating the embeddings for the encrypted sensitive information is initially based on a first-order embedding, wherein the first-order embedding is based on a graph topology of vertices in the data graph, and further based on a second-order embedding that is based on a particular task that is related to the query.

20. The computer system of claim 17, wherein the stored program instructions are provided as a service in a cloud environment.

* * * * *